United States Patent
Chen et al.

(10) Patent No.: US 11,543,235 B2
(45) Date of Patent: Jan. 3, 2023

(54) HYBRID INTERFEROMETRIC AND SCATTEROMETRIC SENSING USING IN-PLANE SENSORS

(71) Applicant: Apple Inc., Cupertino, CA (US)

(72) Inventors: Tong Chen, Fremont, CA (US); Fei Tan, San Jose, CA (US); Mingzhou Jin, Campbell, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 17/219,779

(22) Filed: Mar. 31, 2021

(65) Prior Publication Data

US 2022/0316856 A1    Oct. 6, 2022

(51) Int. Cl.
 *G01B 9/02* (2022.01)
 *G01N 21/47* (2006.01)

(52) U.S. Cl.
 CPC ......... *G01B 9/02092* (2013.01); *G01N 21/47* (2013.01)

(58) Field of Classification Search
 CPC ............................. G01B 9/02092; G01N 21/47
 See application file for complete search history.

(56) References Cited

U.S. PATENT DOCUMENTS

| | | | |
|---|---|---|---|
| 6,233,045 B1* | 5/2001 | Suni | ......... G01P 3/366 356/5.1 |
| 8,264,284 B2 | 9/2012 | Moench | |
| 9,091,747 B2 | 7/2015 | Pruijmboom | |
| 9,726,474 B2 | 8/2017 | Royo Royo et al. | |
| 10,880,005 B2 | 12/2020 | McLaurin et al. | |
| 2011/0126617 A1* | 6/2011 | Bengoechea Apezteguia | ............. G01B 9/02092 73/146 |
| 2019/0293543 A1 | 9/2019 | Norgia et al. | |
| 2019/0317639 A1 | 10/2019 | Winkler et al. | |
| 2019/0331473 A1 | 10/2019 | Johnson et al. | |
| 2019/0346360 A1 | 11/2019 | Jutte et al. | |
| 2020/0350744 A1 | 11/2020 | Gerlach | |
| 2020/0370879 A1 | 11/2020 | Mutlu et al. | |
| 2021/0028603 A1 | 1/2021 | Lee et al. | |
| 2022/0155052 A1* | 5/2022 | Mutlu | ..................... G01S 17/89 356/450 |

FOREIGN PATENT DOCUMENTS

| | | |
|---|---|---|
| EP | 1035423 | 9/2000 |
| WO | WO 20/002616 | 1/2020 |

OTHER PUBLICATIONS

U.S. Appl. No. 17/219,744, filed Mar. 31, 2021, Chen et al.

\* cited by examiner

*Primary Examiner* — Jonathan M Hansen
(74) *Attorney, Agent, or Firm* — Brownstein Hyatt Farber Schreck, LLP

(57) ABSTRACT

An optical sensor system including a semiconductor substrate; a self-mixing interferometry (SMI) sensor formed on the semiconductor substrate and including a semiconductor laser having a resonant cavity; and an array of photodetectors formed on the semiconductor substrate. The SMI sensor is configured to generate an SMI signal responsive to a retro-reflection of electromagnetic radiation emitted by the semiconductor laser and received into the resonant cavity. The array of photodetectors is configured to generate a set of angular-resolved scatter signals responsive to a scatter of the electromagnetic radiation emitted by the semiconductor laser.

23 Claims, 25 Drawing Sheets

HYBRID INTERFEROMETRIC AND SCATTEROMETRIC SENSING USING IN-PLANE SENSORS

FIELD

The described embodiments generally relate to optical sensing and, more particularly, to devices that may be used for both interferometric and scatterometric optical sensing.

BACKGROUND

Coherent optical sensing, including Doppler velocimetry and heterodyning, can be used to obtain spatial information for a target. Example targets include objects, surfaces, particles, and so on. Example spatial information includes presence, distance, velocity, size, surface properties, particle count, and so on. Coherent optical sensing can sometimes be used to obtain spatial information for a target with optical wavelength resolution, at quantum limit signal levels, and with considerably lower photon energy than time-of-flight optical sensing methods. Coherent optical sensing can also limit interference from external aggressors such as ambient light or light generated by light sources of other optical sensing systems.

Semiconductor lasers integrated with wafer-level or wafer-bonded photodetectors enable coherent optical sensing using a monolithic sensor structure. For example, a semiconductor laser may generate and emit electromagnetic radiation from a resonant cavity of the semiconductor laser, receive returned (e.g., reflected or scattered) electromagnetic radiation back into the resonant cavity, self-mix the generated and returned electromagnetic radiation within the resonant cavity, and produce a self-mixing interferometry (SMI) signal that can be used to determine spatial information for a target. However, due to the retro-reflective nature of the SMI optical path, a likely angular incoherence of backscattered electromagnetic radiation, a likely small optical aperture and field of view of the semiconductor laser, and a possible high absorption of received electromagnetic radiation by the target, only a small amount of the electromagnetic radiation emitted by the semiconductor laser may be returned to the semiconductor laser's resonant cavity (i.e., the optical power of the returned electromagnetic radiation may be a small fraction of the optical power of the emitted electromagnetic radiation (sometimes less than 1 parts-per-million (ppm)).

In demanding sensing applications, such as particulate matter detection, surface profiling, and so on, the low optical power of electromagnetic radiation returned to a semiconductor laser's resonant cavity, along with the presence of noise, makes it difficult to make accurate or high resolution characterizations of a device's environment and/or the relationship of a device to its environment.

SUMMARY

Embodiments of the systems, devices, methods, and apparatus described in the present disclosure employ a combination of interferometric and scatterometric sensing techniques. Both interferometric sensors (e.g., SMI sensors) and angular-resolved scatterometric sensors may be formed on (or attached to) a shared substrate (e.g., a semiconductor substrate, or die). In many embodiments, the emission and sensing of electromagnetic radiation may be performed in-plane. The scatterometric sensors may receive much of the electromagnetic radiation that is emitted by an SMI sensor, returned from a target, but not received back into the resonant cavity of the SMI sensor. Not only does the addition of the scatterometric sensors increase the signal-to-noise ratio (SNR) of an optical sensing system as a whole, but it may enable a more accurate or higher resolution capture of spatial information from slow-moving or stationary targets, sparse targets (e.g., a low density of particles in air), and so on.

In a first aspect, the present disclosure describes an optical sensor system. The optical sensor system may include a semiconductor substrate, an SMI sensor formed on the semiconductor substrate and including a semiconductor laser having a resonant cavity, and an array of photodetectors formed on the semiconductor substrate. The SMI sensor may be configured to generate an SMI signal responsive to a retro-reflection of electromagnetic radiation emitted by the semiconductor laser and received into the resonant cavity. The array of photodetectors may be configured to generate a set of angular-resolved scatter signals responsive to a scatter of the electromagnetic radiation emitted by the semiconductor laser.

In a second aspect, the present disclosure describes another optical sensor system. The optical sensor system may include a wafer-integrated array of semiconductor devices, including a semiconductor laser and a set of resonant-cavity photodetectors (RCPDs). The optical sensor system may also include an optical subsystem configured to direct a retro-reflection of electromagnetic radiation emitted by the semiconductor laser toward an RCPD in the set of RCPDs. The optical subsystem may also be configured to direct an angular-resolved scatter of the electromagnetic radiation emitted by the semiconductor laser toward a subset of RCPDs in the set of RCPDs.

In a third aspect, the present disclosure describes an electronic device. The electronic device may include a semiconductor substrate, a set of semiconductor devices formed on the semiconductor substrate, and a processor. The processor may be configured to operate a first semiconductor device in the set of semiconductor devices to emit electromagnetic radiation from a resonant cavity of the first semiconductor device; determine a set of parameters of an SMI signal generated as a result of a self-mixing of electromagnetic radiation within the resonant cavity; contemporaneously with operating the first semiconductor device, sense a scatter of the emitted electromagnetic radiation using a subset of semiconductor devices in the set of semiconductor devices; and characterize at least one of an environment of the electronic device, or a relationship between the electronic device and the environment, using the determined set of parameters of the self-mixing interferometry signal and the sensed scatter.

In a fourth aspect, the present disclosure describes an optical sensor system. The optical sensor system may include a semiconductor substrate, an external photon-mixing sensor formed on the semiconductor substrate, and an array of photodetectors formed on the semiconductor substrate. The external photon-mixing sensor may include a semiconductor laser and a photon-mixing detector. The external photon-mixing sensor may be configured to generate a field-based coherent scatterometry signal responsive to a combination of electromagnetic radiation emitted by the semiconductor laser and a portion of the emitted electromagnetic radiation that is backscattered to the photo-mixing detector. The array of photodetectors may be configured to generate a set of intensity-based scatterometry signals responsive to a backscatter of the electromagnetic radiation emitted by the semiconductor laser.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
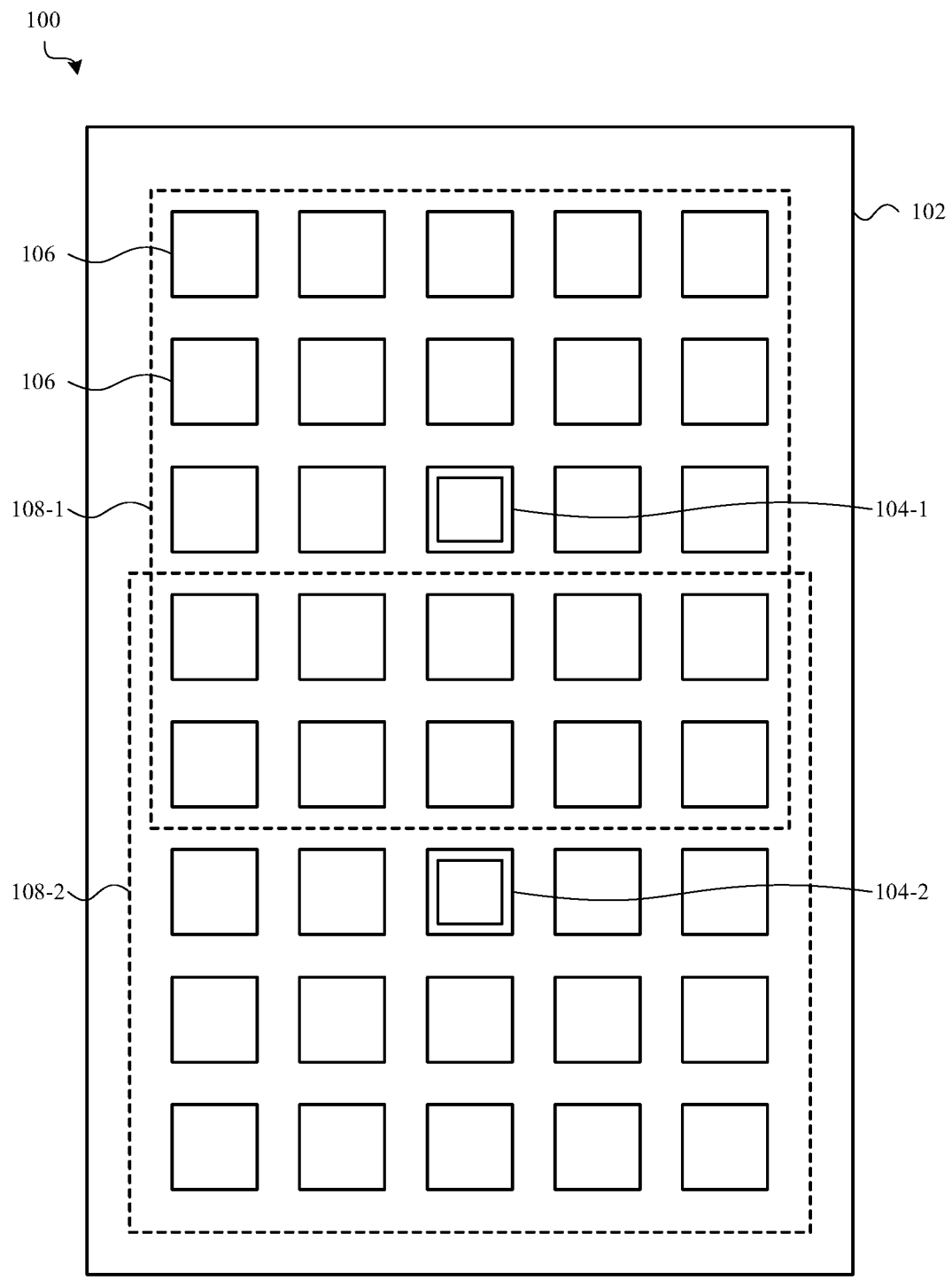
FIG. 1 shows an example plan view of an optical sensor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following description relates to optical sensor systems having both interferometric sensors (e.g., SMI sensors) and angular-resolved scatterometric sensors. All of the sensors may be formed on (or attached to) a shared substrate. For example, the sensors may be integrated on a shared wafer. In many embodiments, the resonant cavities of semiconductor lasers and the resonant cavities of RCPDs may be in-plane. In some embodiments, both SMI sensors and RCPDs may be formed on a shared substrate using a shared process, and may share part or all of the same set of epitaxial layers (e.g., the SMI sensors and RCPDs may be co-grown). However, in some embodiments, different semiconductors may be provided with diversity via different epitaxial thicknesses, different dopings or intermixing, different numerical apertures (NAs), different working distances (WDs), or different polarizations. Different semiconductor devices may also be tuned to emit or receive different wavelengths of electromagnetic radiation.

The scatterometric sensors may receive much of the electromagnetic radiation that is emitted by an SMI sensor, returned from a target backscattering, but not received back into the resonant cavity of the SMI sensor. In some cases, and by way of example, the scatterometric sensors may capture up to 1000 ppm or more of the electromagnetic radiation emitted by an SMI sensor and subsequently returned from a target, whereas the SMI sensor that emitted the electromagnetic radiation may receive a return of less than 1 ppm of the emitted electromagnetic radiation. A mix of interferometric and scatterometric sensors can therefore be more power efficient as compared to one or an array of SMI sensors.

Optical subsystems of the optical sensor systems described herein may include overhead or on-chip optics (e.g., lenses, collimators, surface gratings (or coatings or treatments), beam splitters, waveguides, and so on) that steer emitted electromagnetic radiation to one or more focal points (e.g., as spot illumination) or one or more regions (e.g., as flood illumination) of a target. The overhead or on-chip optics may provide the same or different polarizations or other optical properties (e.g., NAs) for different semiconductor devices. The optical subsystems may also steer emitted electromagnetic radiation returned from the one or more focal points or regions to portions of an SMI sensor (e.g., to a resonant cavity of a semiconductor laser of an SMI sensor, and in some cases to an adjacent photodetector of an SMI sensor for SMI signal detection) and to a set of scatter photodetectors.

In some cases, the optical subsystem may steer and overlap part of the semiconductor laser's output power, with power returned from one or more focal points, to one or more adjacent photodetectors, thereby causing external coherent mixing on these photodetectors while other photodetectors serve as scatter photodetectors.

In some cases, multiple SMI sensors may be provided within a field of scatter photodetectors, and addressed such that a first of the SMI sensors and a plurality (or all) of the photodetectors are turned on while the remaining SMI sensors are turned off. The first SMI sensor may then be turned off and a second SMI sensor and a plurality of (or all) of the photodetectors may be turned on.

In some cases, multiple or all of a set of semiconductor devices formed on (or attached to) a substrate may be SMI sensors, and one of the SMI sensors may be biased to be operated as an SMI sensor while some or all of the other SMI sensors are biased to be operated as photodetectors.

In some cases, two or more SMI sensors may be operated at the same time and different subsets of photodetectors may detect the respective scatter of their electromagnetic radiation. This may be useful, for example, when a target is in close proximity to an optical sensor system and/or when a target is highly absorptive of the electromagnetic radiation emitted by the SMI sensors (e.g., when an optical sensor system is positioned against human tissue). Two or more SMI sensors may also be operated at the same time when they, and different subsets of photodetectors, are tuned to operate at different wavelengths.

The signals provided by an array of scatter photodetectors may in some cases be used to determine a power spectral density, or bidirectional reflectance distribution function (BRDF), or angular-resolved backscattering profile of a surface or target. The signals provided by scatter photodetectors can also provide information about the variation (or movement) of a target, at a particular angle, over time.

In some cases, a mix of interferometric and scatterometric sensors can provide better fidelity surface or sub-surface sensing, for characterizing things like exterior or interior surface roughness, blood flow within human tissue, a particle count or particle size, and so on.

These and other systems, devices, methods, and apparatus are described with reference to FIGS. 1-19. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1 shows an example plan view of an optical sensor system 100. The optical sensor system 100 may be used for various purposes, and in some cases may be used to characterize an object, particles, a surface, a user, or other items within a field of view or optical focus of the optical sensor system 100.

The optical sensor system 100 may include a set of semiconductor devices (e.g., an M×N array of semiconductor devices) formed on a semiconductor substrate 102 (e.g., a semiconductor wafer (or die), such as a silicon (Si) wafer, a gallium arsenide (GaAs) wafer, or an indium phosphide (InP) wafer). The semiconductor devices may include one or more SMI sensors 104 and a set (e.g., an array) of photodetectors 106. Alternatively, the semiconductor devices may only include a set of SMI sensors 104, with each SMI sensor 104 being selectively operable as an SMI sensor or a photodetector. Each SMI sensor 104 may include a semiconductor laser having a resonant cavity. The resonant cavity may be bounded by a pair of distributed Bragg reflectors (DBRs). Each SMI sensor 104 may also include 1) a photodetector configured to generate an SMI signal, such as a photodetector that is integrated with, stacked with, or adjacent to the semiconductor laser, or 2) a circuit that is configured to monitor a junction voltage or current of the semiconductor laser and generate an SMI signal.

An SMI sensor is defined herein as a sensor configured to generate electromagnetic radiation (e.g., light), emit the electromagnetic radiation from a resonant cavity (e.g., a resonant optical cavity, such as a multiple quantum well (MQW) resonant optical cavity), receive a returned portion of the electromagnetic radiation (e.g., electromagnetic radiation that reflects or scatters from a surface) back into the resonant cavity, coherently or partially coherently self-mix the generated and returned electromagnetic radiation within the resonant cavity, and produce an output indicative of the self-mixing (i.e., an SMI signal). The generated, emitted, and returned electromagnetic radiation may be coherent or partially coherent. In some examples, the electromagnetic radiation emitted by an SMI sensor may be generated by an electromagnetic radiation source such as a vertical-cavity surface-emitting laser (VCSEL), a vertical external-cavity surface-emitting laser (VECSEL), an edge-emitting laser (EEL), a horizontal cavity surface-emitting laser (HCSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The generated, emitted, and returned electromagnetic radiation may include, for example, visible or invisible light (e.g., green light, red light, infrared (IR) light, ultraviolet (UV) light, and so on). The output of an SMI sensor (i.e., the SMI signal) may include a photocurrent produced by a photodetector (e.g., a photodiode), which photodetector is integrated with, or positioned under, above, or next to, the sensor's electromagnetic radiation source. Alternatively or additionally, the output of an SMI sensor may include a measurement of the current or junction voltage of the SMI sensor's electromagnetic radiation source.

By way of example, FIG. 1 shows two SMI sensors 104 and thirty-eight photodetectors 106, with each SMI sensor 104 being centered within a field of twenty-four photodetectors 106. Practical implementations of the optical sensor system 100 may have one, a few, or many (e.g., dozens or hundreds) of SMI sensors 104, and a few, several, or many (e.g., dozens, hundreds, or thousands) of photodetectors 106. Each SMI sensor 104 may have a subset of photodetectors 106 that is distributed symmetrically about the SMI sensor 104, or some or all of the SMI sensors 104 may have a subset (or all) of the photodetectors 106 distributed asymmetrically about the SMI sensor 104.

In use, the SMI sensors 104 may be operated singularly and sequentially, but contemporaneously with a subset (or all) of the photodetectors 106. For example, a first SMI sensor 104-1 may be operated to emit electromagnetic radiation from a resonant cavity of a semiconductor laser portion of the first SMI sensor 104-1; receive a retroflection of a portion of the emitted electromagnetic radiation (e.g., a portion of the emitted electromagnetic radiation that reflects off of an object, particles, a surface, a user, or other items within a field of view or optical focus of the SMI sensor 104-1) into the resonant cavity of the semiconductor laser; and coherently self-mix generated and retro-reflected electromagnetic radiation within the resonant cavity. In response to the self-mixing, the SMI sensor 104-1 may generate a first SMI modulation. Contemporaneously with the first SMI sensor 104-1 emitting electromagnetic radiation or receiving a retro-reflection of a portion of the emitted electromagnetic radiation, a first subset (or all) of the photodetectors 106 (e.g., the photodetectors 106 bounded by the imaginary box 108-1) may be operated to receive different target-backscattered portions of the electromagnetic radiation emitted by the SMI sensor 104-1, and to generate a first set of angular-resolved scatter signals. In practical applications of the optical sensor system 100, the SMI sensor 104-1 may receive less than 0.1%, and often much less than 1 ppm, of its emitted electromagnetic radiation as a retroflection, whereas the subset of photodetectors 106 may collectively receive greater than 1%, 5%, 10%, 20%, or more of the emitted electromagnetic radiation as scatter. The SMI sensor 104-1 may therefore be used to perform interferometric measurements using a small portion of the emitted electromagnetic radiation; and the subset of photodetectors 106 may be used to contemporaneously perform scatterometric measurements using a substantially greater portion of the emitted electromagnetic radiation.

After operating the first SMI sensor 104-1 and first subset of photodetectors 106, a second SMI sensor 104-2 and second subset (or all) of the photodetectors 106 (e.g., the photodetectors 106 bounded by the imaginary box 108-2) may be operated contemporaneously, to generate a second SMI signal and second set of angular-resolved scatter signals. Alternatively, in embodiments in which each of the semiconductor devices on the semiconductor substrate 102 is an SMI sensor, one SMI sensor at a time may be operated as an SMI sensor, while a subset (or all) of the rest of the SMI sensors are operated as photodetectors instead of SMI sensors.

Examples of interferometric and scatterometric measurements include determinations of presence, distance, velocity, size, surface properties, particle count, and so on.

Figure 2:
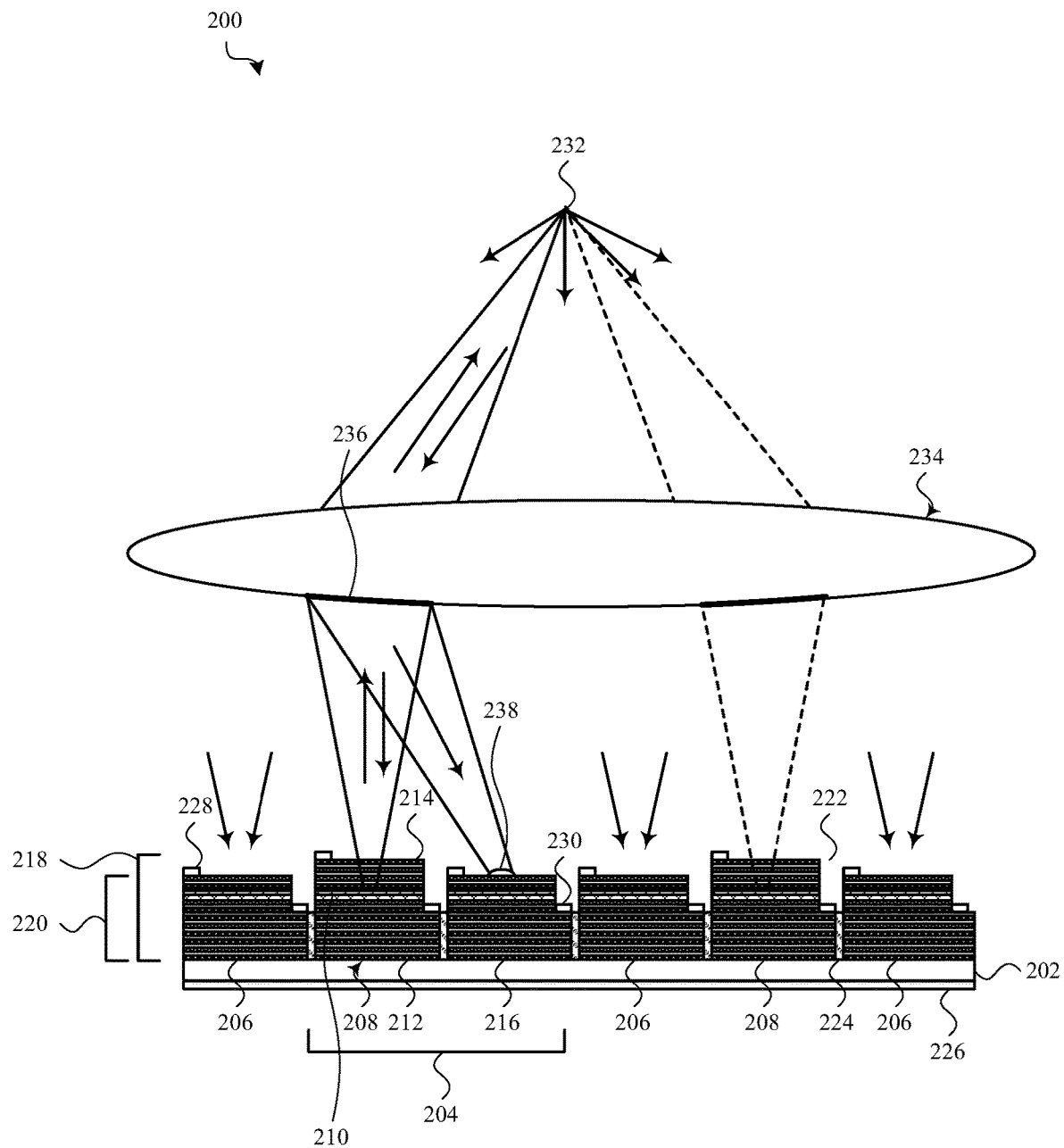
FIG. 2 shows an example elevation of an optical sensor system including a wafer-integrated array of semiconductor devices.

FIG. 2 shows an example elevation of an optical sensor system 200 including a wafer-integrated array of semiconductor devices. The optical sensor system 200 is an example of the optical sensor system described with reference to FIG. 1.

The optical sensor system 200 may include a set of semiconductor devices formed on a semiconductor substrate 202 (e.g., a semiconductor wafer (or die)). The semiconductor devices may include one or more SMI sensors 204 and a set (e.g., an array) of photodetectors 206. Each SMI sensor 204 may include a semiconductor laser 208 having a resonant cavity 210. The resonant cavity 210 may be bounded by a pair of distributed Bragg reflectors (DBRs) 212, 214. By way of example, the SMI sensors 204 are shown to be VCSELs. Alternatively, the SMI sensors 204 may be HCSELs or other types of semiconductor lasers. Each SMI sensor 204 may also include a photodetector 216 configured to detect an SMI modulation, such as a photodetector 216 (e.g., an RPCD) that is adjacent to the semiconductor laser (or VCSEL) 208. Alternatively, each SMI sensor 204 may include 1) a photodetector that is integrated or stacked with the semiconductor laser 208 and configured to generate an SMI signal, or 2) a circuit that is configured to monitor a junction voltage or current of the semiconductor laser 208 and generate an SMI signal.

The photodetectors 206 may be constructed similarly to the semiconductor lasers 208 and may be RCPDs.

The semiconductor lasers 208 and photodetectors 216 of the SMI sensors 204, as well as the photodetectors 206, may all share a subset of epitaxial layers 220 (or all of the epitaxial layers 218) formed on the semiconductor substrate 202. For example, a set of epitaxial layers 218 may be deposited to form a set of lower DBR layers, a resonant cavity, and a set of upper DBR layers. Trenches 222 may then be etched or cut in the set of epitaxial layers 218 to define, and electrically decouple, an array of semiconductor devices (e.g., the semiconductor lasers 208, photodetectors 216, and photodetectors 206). In some cases, the trenches 222 may expose an aluminum (Al) rich layer in the epitaxial layers 218, to be oxidized for optical and electrical aperture definition for the semiconductor laser 208, the photodetector 216, and so on. In some cases, a fill material (e.g., deep trench isolation (DTI), or ion implantation 224) may be deposited in at least portions of the trenches 222 to provide lateral electrical and/or optical separation (or isolation) between adjacent semiconductor devices. Also, the set of upper DBR layers may be etched to thin the upper DBR layers above the photodetectors 216, 206, making the upper DBR layers over the photodetectors 216, 206 more transmissive to allow the photodetectors 216, 206 to receive a greater portion, larger field of view, and wider spectrum of the retroflected or scattered electromagnetic radiation emitted by the semiconductor lasers 208 (i.e., to improve collection efficiency of the photodetectors 216, 206). Regardless of whether some of the upper DBR layers are removed, a useful aspect of the optical sensor system 200 (and most all of the optical sensor systems described herein) is that electromagnetic emission and sensing is performed in-plane. For example, and as shown in FIG. 2, the resonant cavities 210 of the semiconductor lasers 208 and photodetectors (or RCPDs) 216, 206 may all be formed in-plane, using the same process. This can mitigate manufacturing variance (e.g., changes leading to variation in emitted or detected wavelengths), thermal variance, and so on.

In some embodiments, a common cathode 226 may be formed on the backside of the semiconductor substrate 202 (i.e., opposite a side of the semiconductor substrate 202 on which the set of epitaxial layers 218 is formed). A set of per-device anodes 228 may be formed on top of the upper DBR layers of each semiconductor device. Optionally, a per-device intra-cavity cathode 230 (e.g., a cathode 230 formed on the lower DBR of a semiconductor device and coupled to the device's resonant cavity) may be formed for some or all of the semiconductor devices.

An optical subsystem 234 may be disposed in an optical path of one, some, or all of the semiconductor devices. The optical subsystem 234 may in some cases include one or more global optic elements, each of which is positioned over the entire array of semiconductor devices formed on the semiconductor substrate 202. Additionally or alternatively, the optical subsystem 234 may include one or more local optic elements, each of which is positioned over a singular semiconductor device or subset of semiconductor devices.

As shown, the optical subsystem 234 may in some cases include an optical beam splitter 236, which splits a beam of electromagnetic radiation emitted by a semiconductor laser 208, or which splits a retro-reflected portion of the electromagnetic radiation, to redirect the portion of the emitted or retro-reflected electromagnetic radiation toward the photodetector 216. In alternative embodiments, in which the photodetector 216 is integrated or stacked with the semiconductor laser 208, or in which a circuit is used to extract an SMI signal by monitoring the junction voltage or current of the semiconductor laser 208, the optical beam splitter 236 need not be provided.

By way of example, the optical subsystem 234 is shown to be confocal. In other words, the optical subsystem 234 may direct electromagnetic radiation emitted by each of the semiconductor lasers 208 toward a focal point 232, and may direct a retro-reflection and scatter from the focal point (within a range of incident angles) toward the semiconductor devices of the optical sensor system 200, in an angular-resolved manner (i.e., the semiconductor lasers 208, photodetectors 216, and photodetectors 206 each receive electromagnetic radiation returned from the focal point at a particular incident angle, or particular range of incident angles, with respect to the focal point).

In some embodiments, the optical subsystem 234 may include a set of OCLs (i.e., lenses 238 formed directly on individual semiconductor devices, such as on individual ones of the semiconductor lasers 208 or photodetectors 216, 206). The OCLs may take the form of intrinsic OCLs (e.g., gallium arsenide (GaAs) lenses formed on an epitaxial stack) or extrinsic OCLs (e.g., lenses deposited after epitaxial processes have been completed, such as polymer or dielectric lenses).

Figure 3:
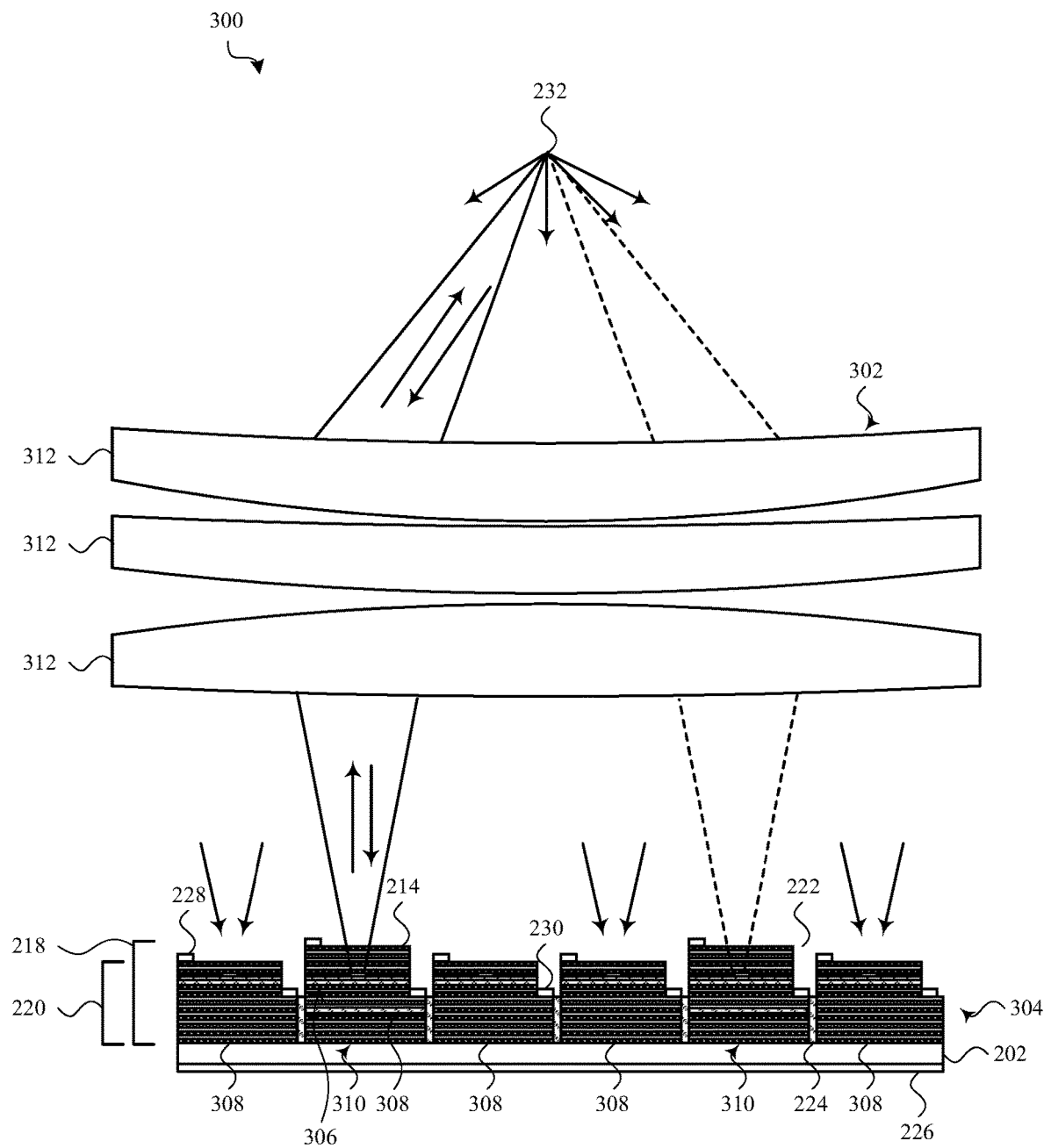
FIG. 3 shows an optical sensor system including a telecentric-confocal imaging system.

FIGS. 3-5B show various alternative examples of the optical subsystem described with reference to FIG. 2. For example, FIG. 3 shows an optical sensor system 300 including a telecentric-confocal imaging system 302 (an example of the optical subsystem described with reference to FIG. 2) positioned apart from an array of semiconductor devices 304. The array of semiconductor devices 304 may include a set of semiconductor lasers 306 and a set of photodetectors 308 (e.g., RCPDs). The semiconductor lasers 306 may be integrated or stacked with photodetectors, or associated with monitoring circuits or adjacent photodetectors 308, to form SMI sensors 310. By way of example, the optical sensor system 300 includes SMI sensors 310 in which photodetectors are stacked or integrated with respective semiconductor lasers 306, or in which semiconductor lasers 306 are associated with respective monitoring circuits. Many aspects of the optical sensor system 300 may be similar to those of the optical sensor system described with reference to FIG. 2, and those aspects are numbered similarly.

The telecentric-confocal imaging system 302 may be positioned in a set of electromagnetic radiation emission paths of the set of semiconductor lasers 306, and in a set of electromagnetic radiation reception paths of the set of photodetectors 308. In some cases, the telecentric-confocal imaging system 302 may include a set of lenses 312, such as a set of lenses including a telecentric F-theta scan lens with finite conjugates.

Figure 4:
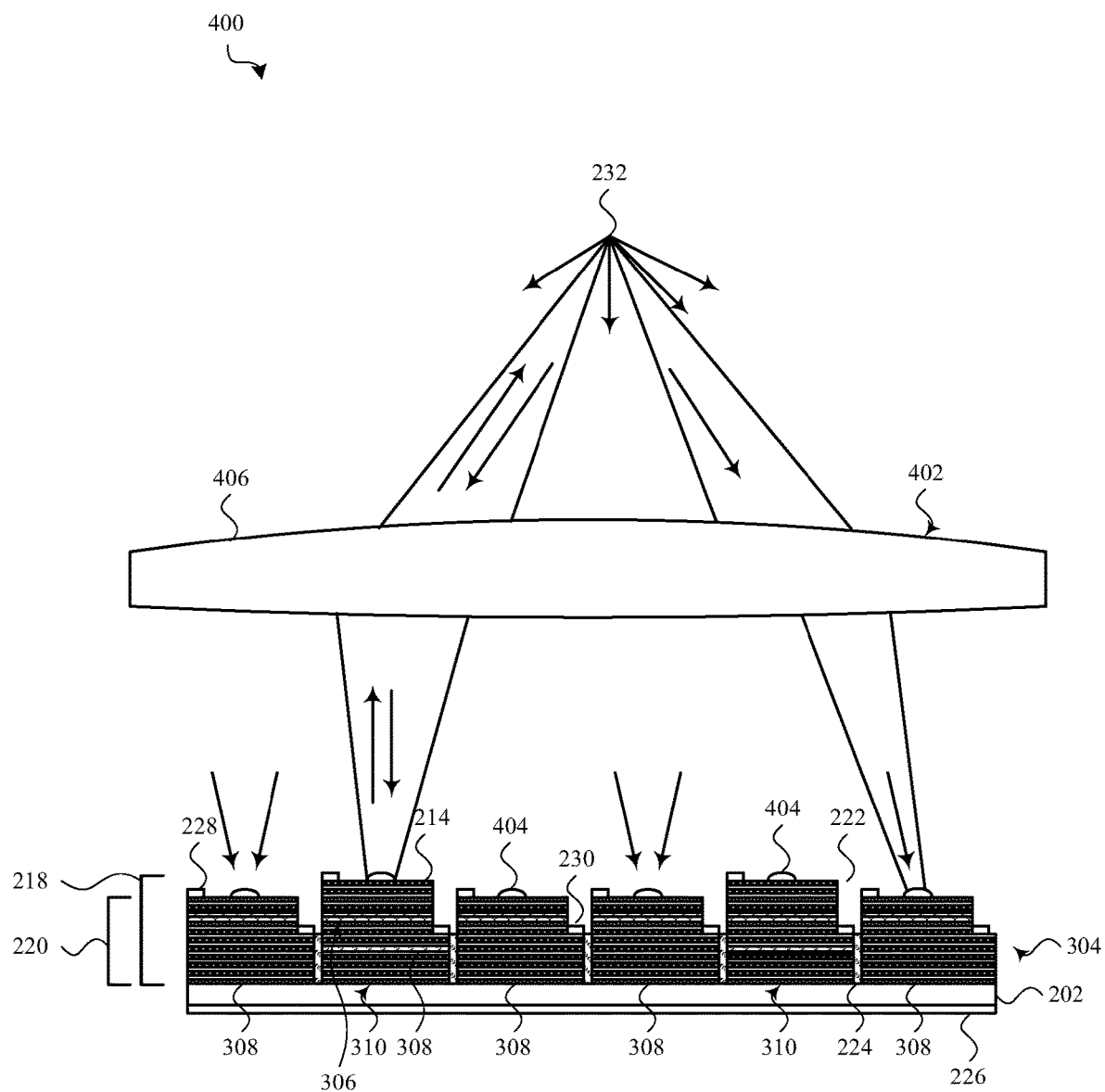
FIG. 4 shows an optical sensor system including an on-chip lens (OCL)-confocal imaging system.

FIG. 4 shows an optical sensor system 400 including an OCL-confocal imaging system 402 (an example of the optical subsystem described with reference to FIG. 2) and the array of semiconductor devices 304 described with reference to FIG. 3. The OCL-confocal imaging system 402 may include a set of OCLs 404 formed on the array of semiconductor devices 304 (e.g., on individual semiconductor lasers 306 and/or photodetectors 308). The OCL-confocal imaging system 402 may also include a confocal imaging system (e.g., one or more lenses, or a confocal imaging lens) 406 positioned apart from the array of semiconductor devices 304, in both a set of electromagnetic radiation emission paths of the set of semiconductor lasers 306, and in a set of electromagnetic radiation reception paths of the set of photodetectors 308. Each OCL 404 may have a prescription (e.g., lens sag, lens shape, aperture offset, and so on) that is matched to the chief and marginal ray angles of the confocal imaging system 406, and that corrects for aberration of the semiconductor device 304 on which it is disposed. In some embodiments, an on-chip wedge lens, diffractive grating, or meta surface may also be disposed on a semiconductor device 304.

Figure 5A:
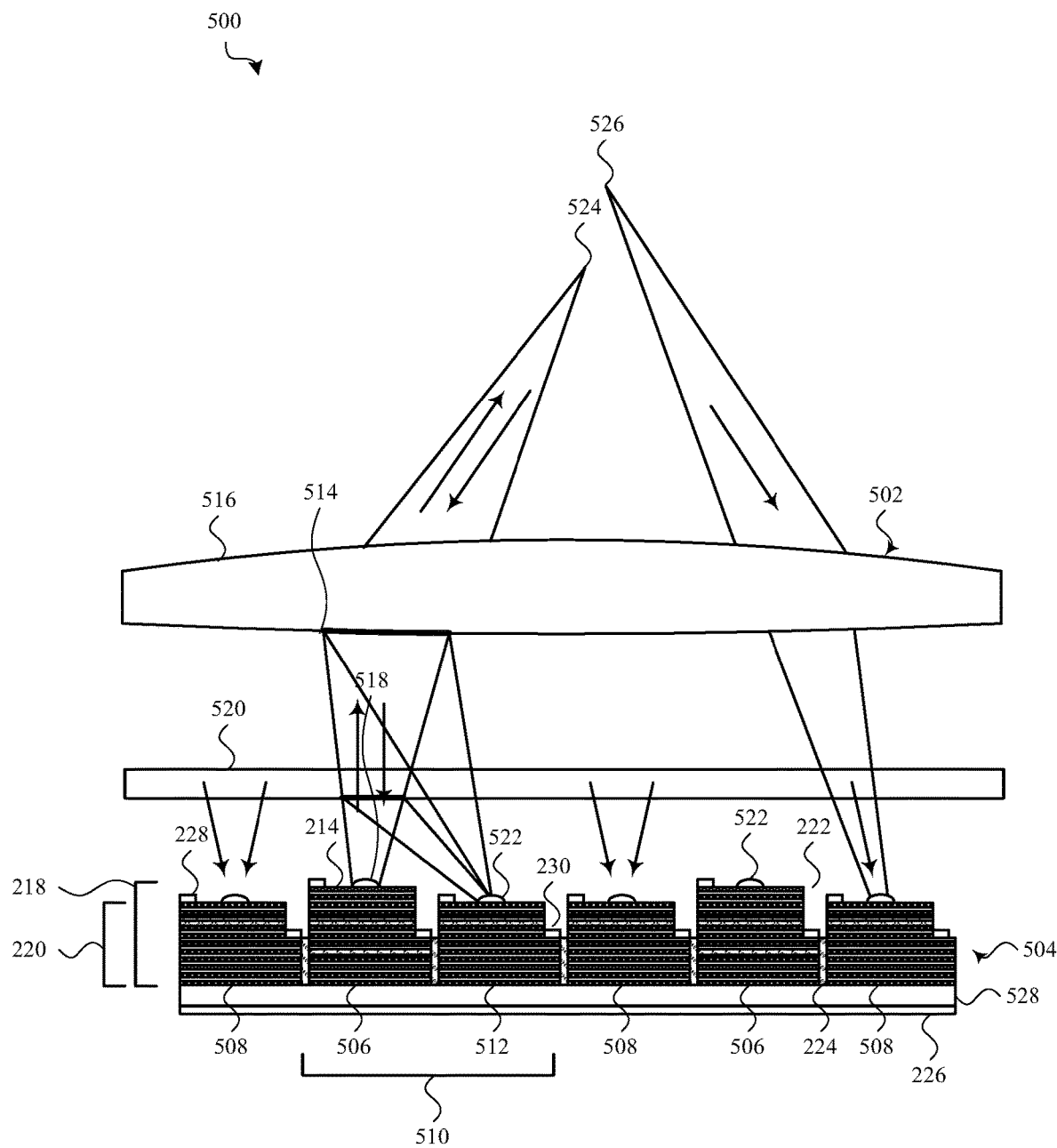
FIG. 5A shows an optical sensor system including a beam-splitting and non-confocal imaging system.

FIG. 5A shows an optical sensor system 500 including a beam-splitting and non-confocal imaging system 502 (an example of the optical subsystem described with reference to FIG. 2) and an array of semiconductor devices 504. The array of semiconductor devices 504 may include a set of semiconductor lasers 506 and a set of photodetectors 508 (e.g., RCPDs). The semiconductor lasers 506 may be integrated or stacked with photodetectors, or associated with monitoring circuits or adjacent photodetectors, to form SMI sensors 510. By way of example, the optical sensor system 500 includes SMI sensors 510 in which SMI photodetectors 512 are disposed adjacent respective semiconductor lasers 506.

The beam-splitting and non-confocal imaging system 502 may include an optical beam splitter, which in some cases may take the form of a reflective element 514 disposed on an imaging lens 516, or a reflective element 518 disposed on a cover 520, intermediate element, or other lens disposed in the optical path of a semiconductor laser 506. In some cases, the reflective element 514 or 518 may include a reflective film, coating, surface treatment, or component. The reflective element 514 or 518 may redirect a portion of the electromagnetic radiation emitted by the semiconductor laser 506 toward an SMI photodetector 512, and allow the remainder of the emitted beam to pass. In some cases, the reflective element 514 or 518 may be only partially reflective, allowing some electromagnetic radiation to pass through the reflective element 514 or 518. In some cases, the reflective element 514 or 518 may completely reflect a wavelength of electromagnetic radiation emitted by the semiconductor laser 506, but may be sized so that it only intersects part of an emitted beam of electromagnetic radiation, allowing some electromagnetic radiation to pass around the reflective element 514 or 518.

The beam-splitting and non-confocal imaging system 502 may also include a non-confocal imaging system. The non-confocal imaging system may include, for example, 1) a non-confocal imaging lens 516, with or without OCLs 522 on the semiconductor devices 504, or 2) non-confocal OCLs 522 on the semiconductor devices 504, with or without a confocal imaging lens 516.

The non-confocal imaging system may enable one or more of the photodetectors 508 (e.g., different photodetectors or different subsets of photodetectors) to receive scatter from a different focal point 524 than a focal point 526 of the electromagnetic radiation emitted by the semiconductor laser 506. This may in some cases enable the optical sensor system 500 to characterize a medium that exists between the focal point 526 of the emitted electromagnetic radiation and the focal point 524 of the photodetector 508. In some cases, all of the photodetectors 508 used to detect scatter may receive scatter from the same focal point 524. In some cases, different photodetectors 508 may be used to detect scatter from different focal points. In some cases, the beam-splitting and non-confocal imaging system 502 may also or alternatively provide different optical focuses for the electromagnetic radiation that is emitted from, and returned to, the resonant cavity of the semiconductor laser 506. The different focal points of the different optical paths or different semiconductor devices 504 may be laterally offset in a plane parallel to a semiconductor substrate 528 on which the semiconductor devices 504 are formed, or may be located different distances along respective normal perpendicular to the semiconductor substrate 528.

Figure 5B:
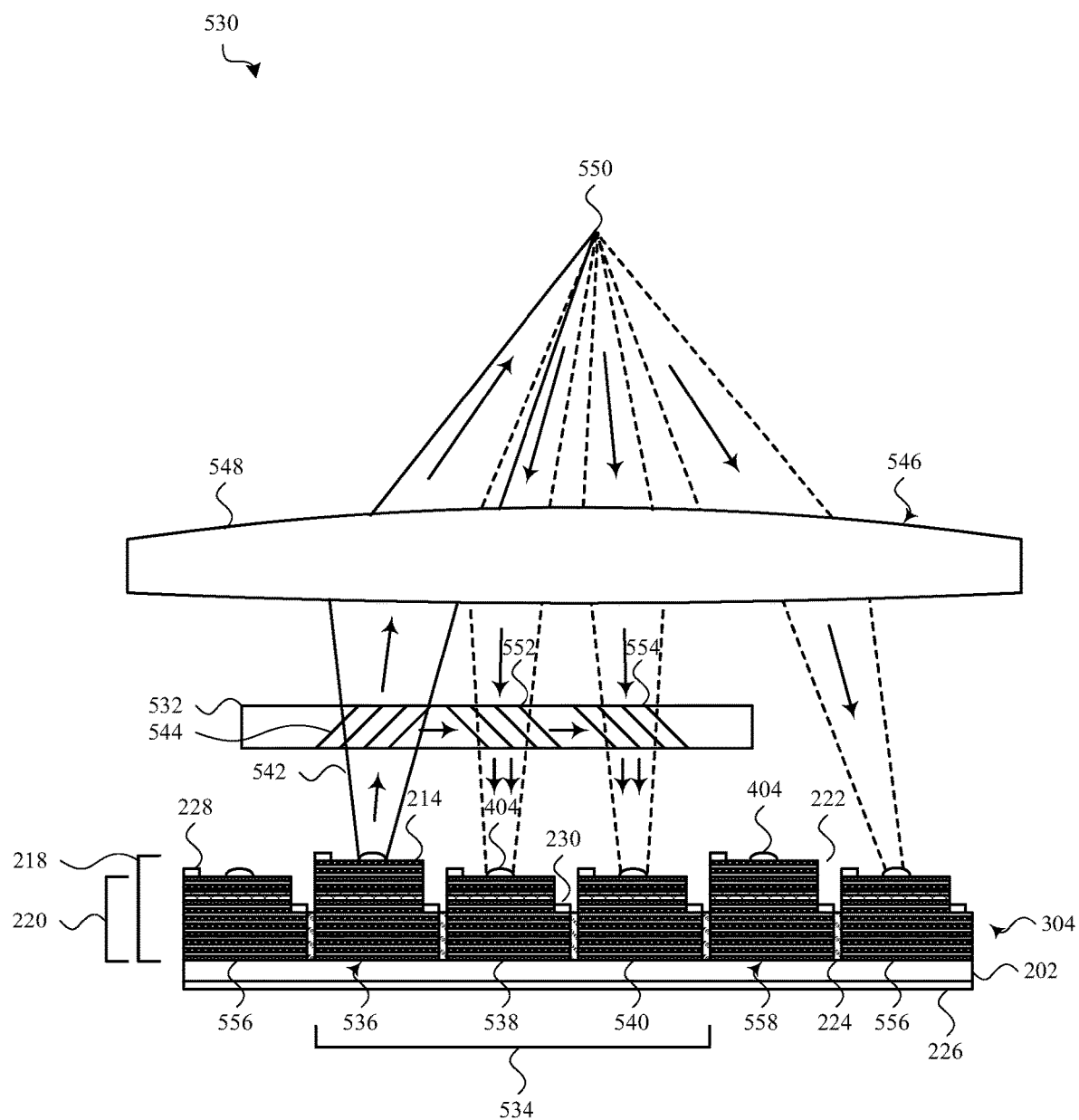
FIG. 5B shows an optical sensor system including a beam combiner for external photon mixing.

FIG. 5B shows an optical sensor system 530 including a beam combiner 532. The beam combiner 532 may be used to facilitate external photon mixing (i.e., mixing of emitted and redirected electromagnetic radiation outside of a semiconductor laser's resonant cavity) instead of facilitating self-mixing interferometry (i.e., mixing of emitted and redirected electromagnetic radiation within a semiconductor laser's resonant cavity). An external photon-mixing sensor 534 of the optical sensor system 530 may include a semiconductor laser 536, a first photodetector (e.g., a first photon-mixing detector 538) spaced apart from, adjacent, and/or in-plane with the semiconductor laser 536, and possibly one or more additional photodetectors (e.g., a second photon-mixing detector 540) that are spaced apart from, adjacent, and/or in-plane with the semiconductor laser 536. A portion of the electromagnetic radiation 542 emitted by the semiconductor laser 536 (e.g., 1% of the electromagnetic radiation) may be tapped into a lateral wave guiding mode in the beam combiner 532 via beam splitting structure 544, while the majority of the electromagnetic radiation 542 (e.g., 99% of the electromagnetic radiation) may continue through one or more lenses 548 of a confocal imaging system 546, toward focal point 550. The beam splitting structure 544 may be or include a polarized beam splitter (PBS) cube, a surface relief grating (SRG), a volume Bragg grating (VBG), and so on. A portion of the emitted electromagnetic radiation that backscatters from a target located at the focal point 550 may be received by the one or more lenses 548 of the confocal imaging system 546 and directed toward the first photon-mixing detector 538 (for example, an RCPD as shown). At the same time, the portion of the emitted electromagnetic radiation (e.g., a local oscillator beam, LO) that is tapped into the lateral wave guiding mode in the beam combiner 532, via the beam splitting structure 544, may be tapped out of the beam combiner 532 by the beam combining structure 552, to overlap and recombine with the electromagnetic radiation (e.g., a scene beam, SC) that is backscattered from the target. The beam combining structure 552 may be or include a PBS cube, an SRG, a VBG, and so on. The tapping out ratio may be, for example, about 20%, 50%, of 99%. Polarization optics may optionally be used to reduce loss of the SC beam through the beam combining structure 552. The mode matching parts of the LO and SC beams may be mixed in the photon-mixing detector 538 and generate a heterodyne signal similar to an SMI signal, with the difference being that the external photon-mixing signal now carries target information from a backscattering angular cone different than the retroreflective cone of an SMI sensor.

In some cases, the LO beam may be further tapped out by the beam combining structure 554, toward an additional photon-mixing detector 540, and mixed with a different target-backscattered SC beam. The LO beam may be tapped out toward any number of photon-mixing detectors.

A number of photon-mixing detectors (e.g., photon-mixing detectors 538, 540) may be enabled by including various tapping out structures (e.g., 552, 554) in the beam combiner 532, creating a "coherent pixel", with the rest of detector structures providing "incoherent pixels" (e.g., photodetectors 556). The incoherent pixels may provide traditional intensity-based scatterometry information (e.g., an intensity-based scatterometry signal), while coherent pixels may provide field-based coherent scatterometry information (e.g., a field-based coherent scatterometry signal) with higher SNR over path length and loss, as well as spatial sensing information such as target velocity, displacement, distance from a different perspective of SMI retroreflective angles, and so on.

Multiple or switchable tapping out structures (e.g., 552, 554) can be enabled in the beam combiner 532, to tap the LO beam out from different semiconductor lasers (e.g., 536 and 558)—at the same time or at selected different times. A tapping out structure (e.g., 552 or 554) may also be switched off to switch the underlying detector (e.g., 538 or 540) from a coherent pixel to an incoherent pixel. Such switchable tapping structures can be realized using liquid crystals, a microelectromechanical system (MEMS), or another adaptive optical technology.

FIGS. 6A-8 show alternative examples of cathode and anode routing for an array of semiconductor devices. In some cases, the semiconductor devices may include the semiconductor lasers and photodetectors described with reference to FIGS. 1-5 or elsewhere in this description.

Figure 6A:
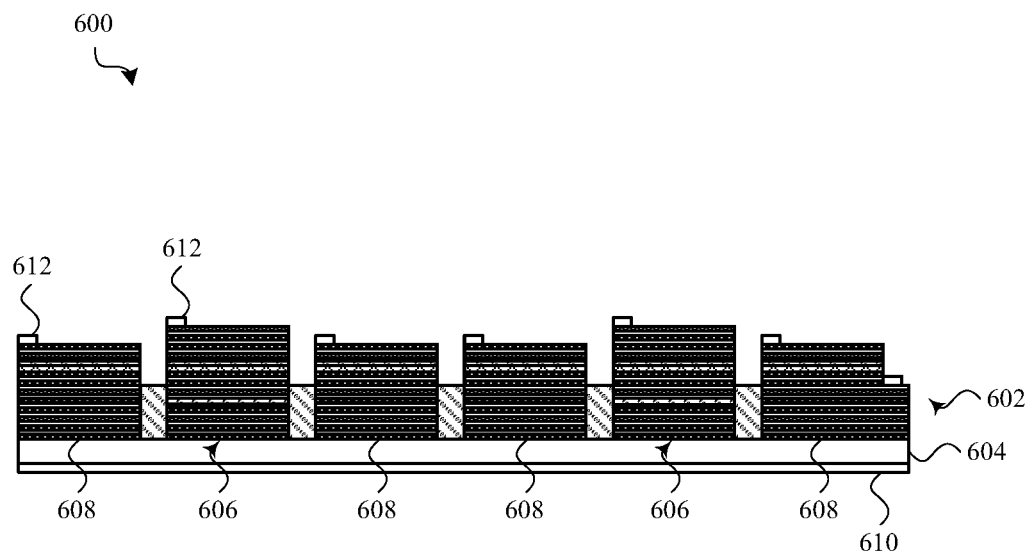
FIG. 6A shows an example elevation of an optical sensor system having an array of semiconductor devices formed on a semiconductor substrate.

FIG. 6A shows an example elevation of an optical sensor system 600 having an array of semiconductor devices 602 formed on a semiconductor substrate 604. The semiconductor devices 602 may include one or more SMI sensors 606 and a set of photodetectors 608 (e.g., RCPDs). A cathode 610 may be formed on a side of the semiconductor substrate 604 opposite a side of the semiconductor substrate 604 on which the array of semiconductor devices 602 is formed. The cathode 610 may be shared by (or common to) all of the semiconductor devices 602.

Figure 6B:
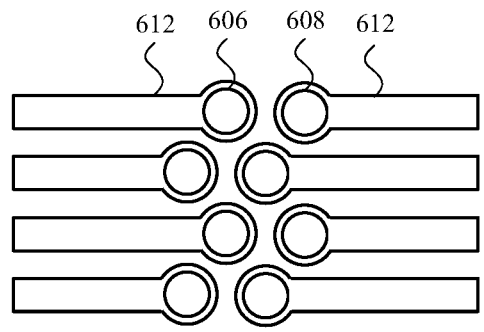
FIG. 6B shows a representative plan view of some of the anode routings shown in FIG. 6A.

A set of anode routings 612 may be formed on the array of semiconductor devices 602 (e.g., on electromagnetic radiation emitting/sensing surfaces of the semiconductor devices 602). The set of anode routings 612 may provide a means to address the semiconductor devices 602. However, the density of the anode routings 612 may not allow for full addressability of the semiconductor devices 602, and may only provide limited addressability in some cases. A representative plan view of some of the anode routings 612 is shown in FIG. 6B.

Figure 7A:
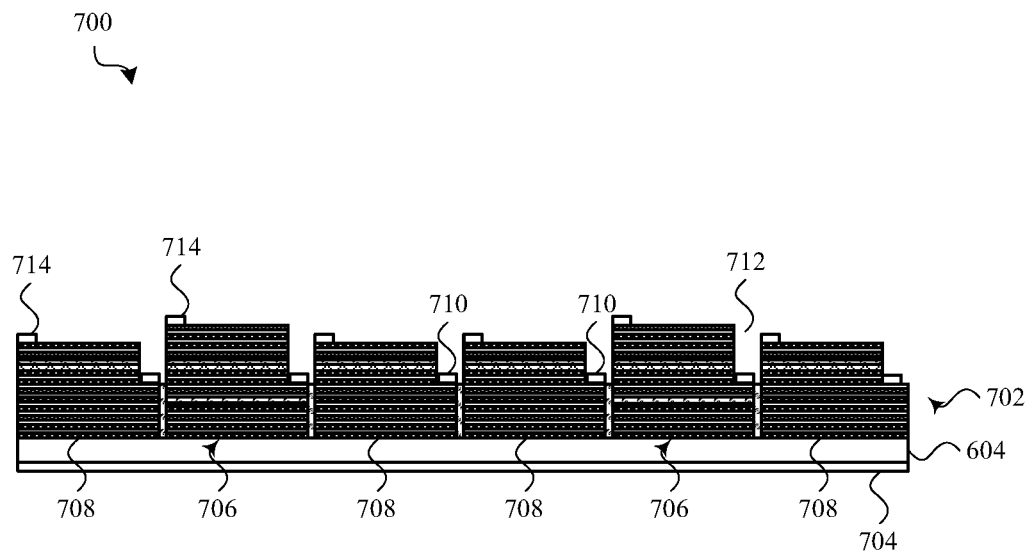
FIG. 7A shows an example elevation of another optical sensor system having an array of semiconductor devices formed on a semiconductor substrate.

FIG. 7A shows an example elevation of another optical sensor system 700 having an array of semiconductor devices 702 formed on a semiconductor substrate 704. The semiconductor devices 702 may include one or more SMI sensors 706 and a set of photodetectors 708 (e.g., RCPDs). A set of cathode routings 710 may be disposed in a set of trenches 712 that separate the semiconductor devices 702, and a set of anode routings 714 may be disposed on the array of semiconductor devices 702 (e.g., on electromagnetic radiation emitting/sensing surfaces of the semiconductor devices 702). In this configuration, the set of cathode routings 710 and the set of anode routings 714 may each provide a means to address the semiconductor devices 702. However, the density and layout of the cathode routings 710 and anode routings 714 may still not allow for full addressability of the semiconductor devices 702, and may only provide limited addressability in some cases.

Figure 7B:
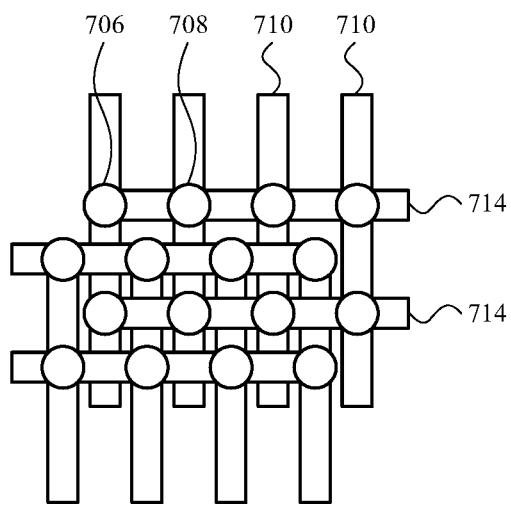
FIG. 7B shows a representative plan view of some of the cathode and anode routings shown in FIG. 7A.

A representative plan view of some of the cathode and anode routings 710, 714 is shown in FIG. 7B. As shown, the set of cathode routings 710 may be oriented in a first set of parallel directions, and the set of anode routings 714 may be oriented in a second set of parallel directions, with the second set of parallel directions being orthogonal to the first set of parallel directions. In this plan, any single semiconductor device 702 (emitter or detector) may be individually addressed, one at a time; or a group of semiconductor devices 702, each of which resides in a different row or column, may be contemporaneously addressed. A scanning sequence can be used to address any combination of semiconductors devices 702, including emitters and/or detectors.

Figure 8:
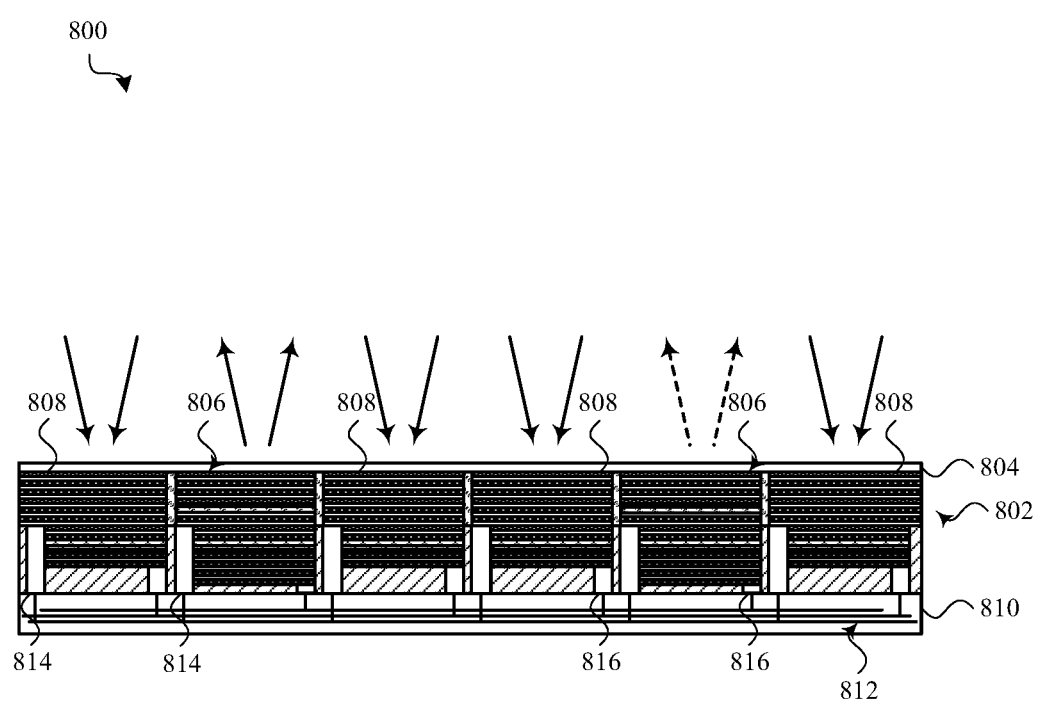
FIG. 8 shows an example elevation of another optical sensor system having an array of semiconductor devices formed on a semiconductor substrate.

FIG. 8 shows an example elevation of another optical sensor system 800 having an array of semiconductor devices 802 formed on a semiconductor substrate 804. The semiconductor devices 802 may include one or more SMI sensors 806 and a set of photodetectors 808 (e.g., RCPDs).

In FIG. 8, the semiconductor devices 802 are back-emitting and back-sensing. The semiconductor devices 802 may be flip-chip bonded to a second semiconductor substrate 810 (e.g., a Si substrate or other semiconductor wafer (or die)) that may include conductive traces 812 coupled to individual cathodes 814 or individual anodes 816 of the semiconductor devices 802. In some embodiments, the semiconductor substrate 804 may be partially or fully removed (e.g., etched away). In a flip-chip configuration, every emitter/detector anode 816 and cathode 814 can be individually addressed simultaneously, through high density multi-layer interconnects in the second semiconductor substrate 810.

Figure 9A:
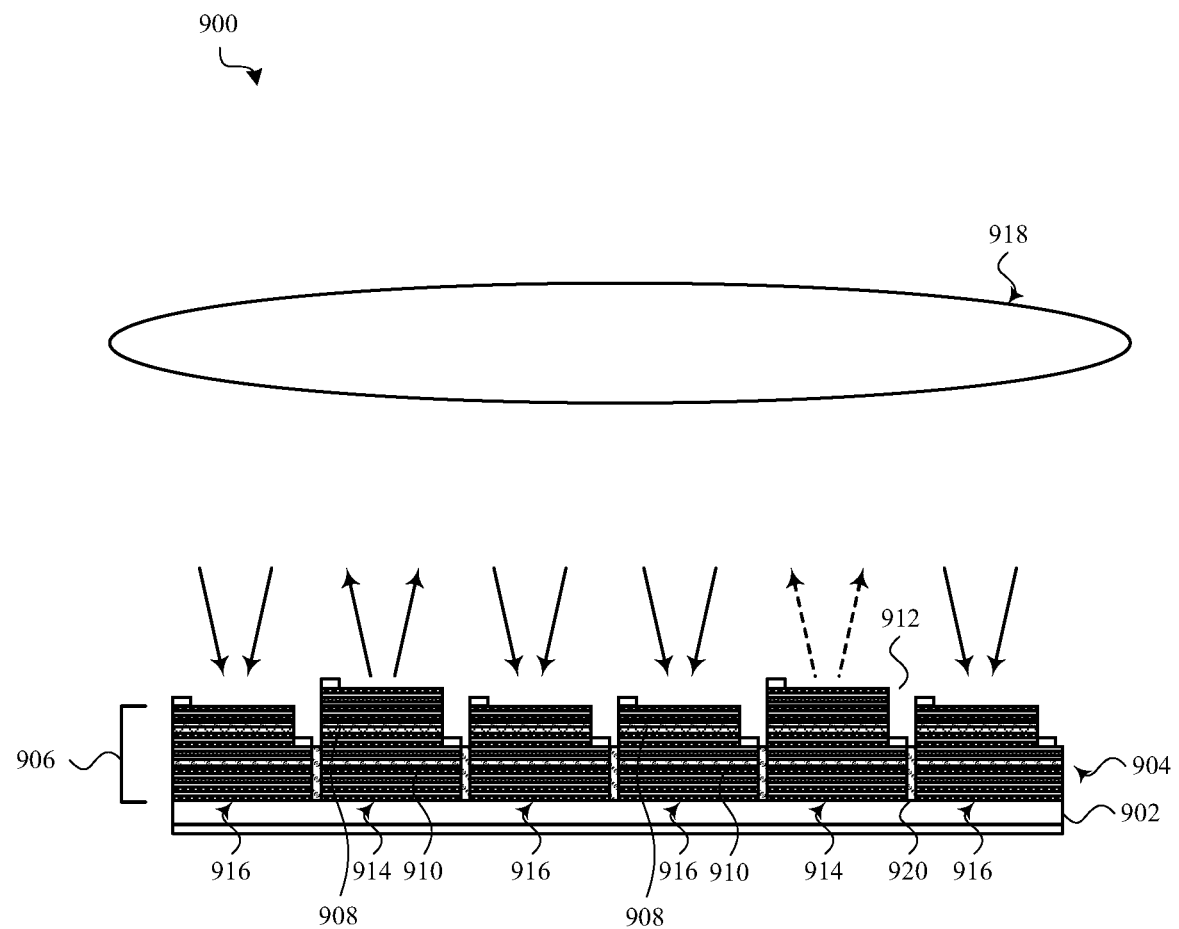
FIG. 9A shows an optical sensor system in which one or more of the semiconductor devices are SMI sensors with integrated photodetectors, and other semiconductor devices are RCPDs with additional integrated photodetectors.
Figure 9B:
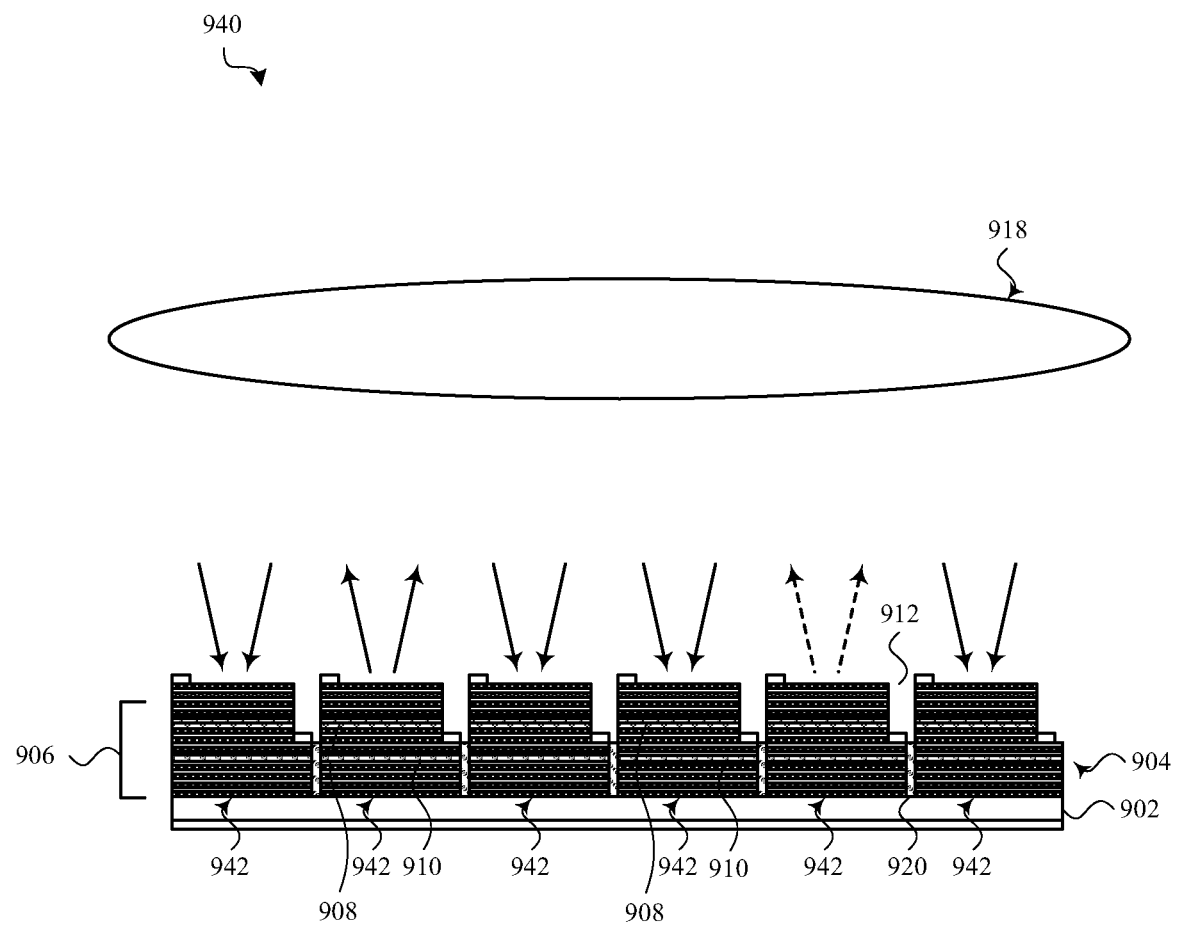
FIG. 9B shows an optical sensor system in which all of the semiconductor devices are SMI sensors with integrated photodetectors.

FIGS. 9A and 9B show example elevations of an optical sensor system 900 or 940 that includes an array of semiconductor devices 904 formed on a semiconductor substrate 902. The array of semiconductor devices 904 may in some cases be formed from a shared set of epitaxial layers 906. Each of the semiconductor devices 904 may include a resonant gain cavity 908, and an integrated photodetector 910 (e.g., an intra-cavity photodetection layer grown between the semiconductor substrate 902 and the resonant gain cavity 908). A tunnel junction may be formed between the resonant gain cavity 908 and the integrated photodetector 910 of a semiconductor device 904, to provide current insulation between the resonant gain cavity 908 and the integrated photodetector 910. To minimize crosstalk and dark current flow between adjacent semiconductor devices 904, lateral insulation may be provided between adjacent ones of the integrated photodetectors 910. The lateral insulation may include, for example, an etched trench 912, oxidation 920 (e.g., DTI) within the trench 912, ion implantation (without a trench 912) and so on.

The optical sensor system 900 or 940 may or may not include an optical subsystem 918 (e.g., as described with reference to any of FIGS. 2-5).

FIG. 9A shows an optical sensor system 900 in which one or more of the semiconductor devices 904 are SMI sensors 914, such as VCSELs with integrated photodetectors 910, and other semiconductor devices 904 are RCPDs 916 with additional integrated photodetectors 910. Some of the epitaxial layers 906 may be etched away for the RCPDs 916, such that the RCPDs 916 have a shallower and more transmissive upper DBR than the SMI sensors 914. Additionally or alternatively, the apertures of the RCPDs 916 may be sized larger than those of the SMI sensors 914, to improve scatter monitoring across a desired and/or greater range of incident angles, or within a desired and/or greater field of view.

In use, the VCSEL of an SMI sensor 914 may be provided with a forward current bias, and the integrated photodetector 910 of the SMI sensor 914 may be provided with a reverse voltage bias. In this mode of operation, the resonant gain cavity 908 of the VCSEL may emit electromagnetic radiation through an upper DBR of the SMI sensor 914, and the integrated photodetector 910 can be used to generate an SMI signal (e.g., a photocurrent). For an RCPD 916, both the resonant gain cavity 908 of the RCPD 916 and the integrated photodetector 910 stacked below the RCPD 916 may be reversely biased, and the photocurrent outputs of the RCPD 916 and integrated photodetector 910 may be ganged together or otherwise summed to generate a scatterometric signal. This can increase the responsivity of a semiconductor device 904 that is used for scatter detection. Alternatively, only the RCPD 916 or the integrated photodetector 910 may be used to generate a scatterometric signal.

FIG. 9B shows an optical sensor system 940 in which all of the semiconductor devices 904 are SMI sensors 942, such as VCSELs with integrated photodetectors 910. In the optical sensor system 940, none of the epitaxial layers 906 need be etched away.

In use, the VCSEL of one of the SMI sensors 942 may be provided with a forward current bias, and its integrated photodetector 910 may be provided with a reverse voltage bias. In this mode of operation, the resonant gain cavity 908 of the VCSEL may emit electromagnetic radiation through an upper DBR of the SMI sensor 942, and the integrated photodetector 910 can be used to generate an SMI signal (e.g., a photocurrent). All other SMI sensors 942 may contemporaneously be operated as RCPDs with integrated photodetectors 910, with both the resonant gain cavity 908 and the integrated photodetector 910 of each of the other SMI sensors 942 being reversely biased, and with the photocurrent outputs of the resonant gain cavity 908 and integrated photodetector 910 being ganged together or otherwise summed to generate a scatterometric signal. Similarly to the optical sensor system 900, this can increase the responsivity of a semiconductor device 904 that is used for scatter detection. Alternatively, only the resonant gain cavity 908 or the integrated photodetector 910 of an RCPD-configured SMI sensor may be used to generate a scatterometric signal.

After one of the SMI sensors 942 is operated as such, a different one of the SMI sensors 942 may be operated as such while the remaining SMI sensors 942 are contemporaneously operated as RCPDs with integrated photodetectors 910.

Figure 9C:
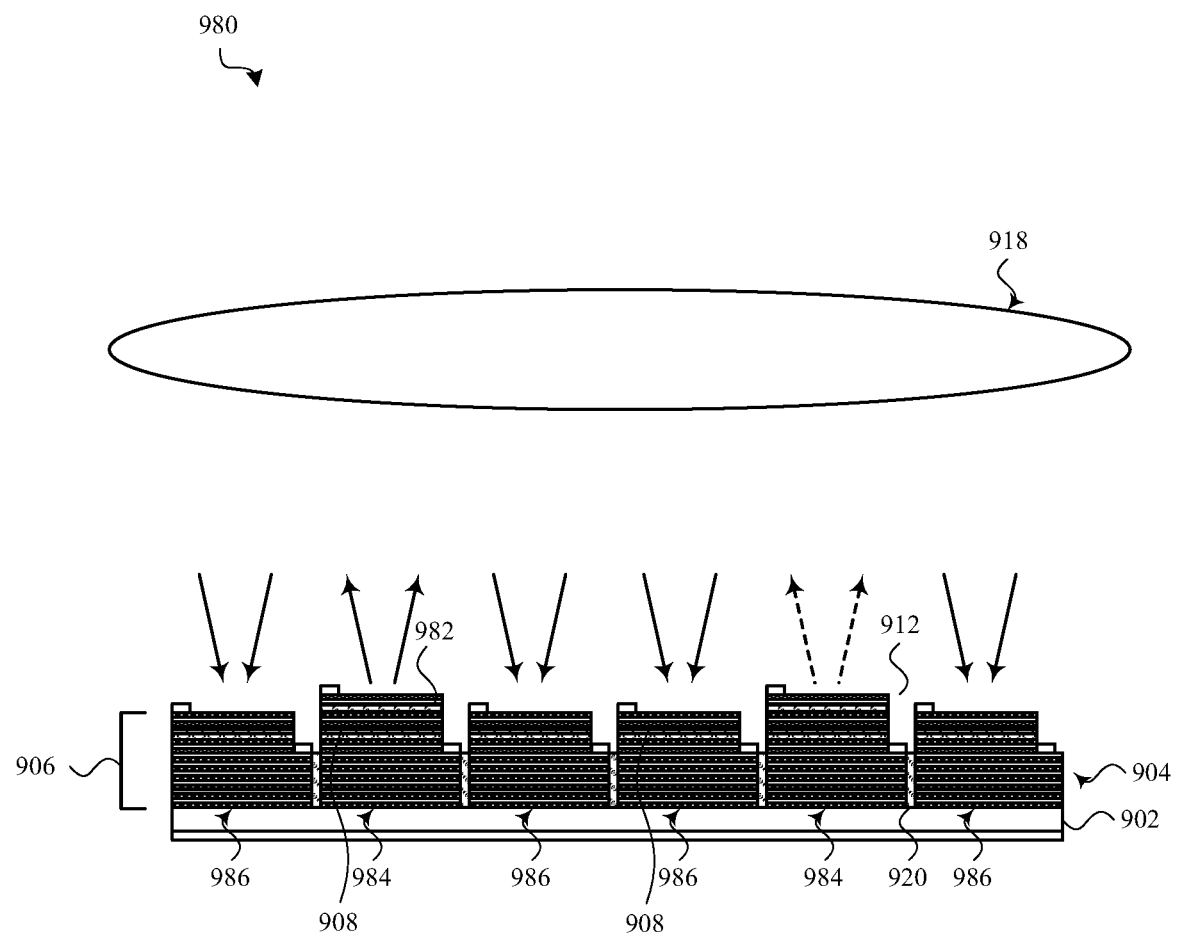
FIG. 9C shows an optical sensor system similar to the optical sensor system described with reference to FIG. 9A, but instead of each of the semiconductor devices having an integrated photodetector grown between the semiconductor substrate and the resonant cavity of a semiconductor device, a photodetector is grown above a resonant cavity of an SMI sensor.

FIG. 9C shows an optical sensor system 980 similar to the optical sensor system described with reference to FIG. 9A, but instead of each of the semiconductor devices 904 having an integrated photodetector (or intra-cavity photodetection layer) grown between the semiconductor substrate 902 and the resonant gain cavity 908 of a semiconductor device 904, a photodetector (e.g., an indium gallium arsenide (InGaAs) photodetector) 982 is grown above a resonant gain cavity 908 of an SMI sensor 984. In some cases, InGaP layers may be formed over all of the semiconductor devices 904, and selectively removed from those that are ultimately configured as RCPDs 986. In other cases, InGaAs layers may only be formed on semiconductor devices 904 that are ultimately configured as SMI sensors 984.

In any of the optical sensor systems 900, 940, 980 described with reference to FIGS. 9A-9C, a photodetection multiplication layer may be grown between the resonant gain cavity 908 and integrated photodetector 910. With a heavy reverse bias, linear avalanche amplification can be achieved. In other words, a resonant cavity avalanche photodetector (RC-APD) may be formed. An RC-APD may provide a higher signal level (e.g., a signal strength that is 5-100× that of an RCPD) and a higher signal-to-noise ratio (SNR). In some cases, an RC-APD may be further reverse biased into Geiger mode, making the RC-APD capable of single photon counting.

Figure 10:
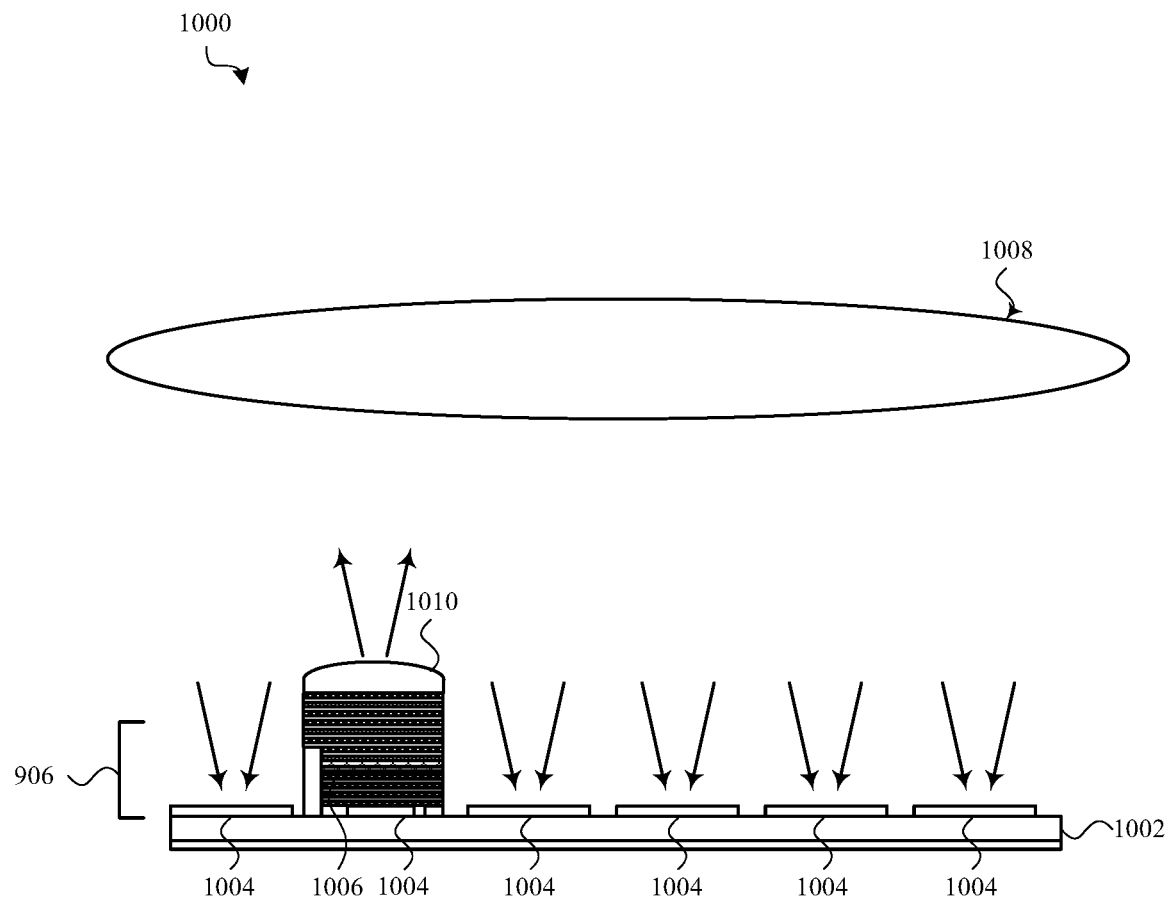
FIG. 10 shows an optical sensor system in which some of its semiconductor devices are formed on a semiconductor substrate, using a common process, and one or more other semiconductor devices are picked, placed, and soldered onto the semiconductor substrate.

FIG. 10 shows an optical sensor system 1000 in which some of its semiconductor devices are formed on a substrate 1002 (e.g., a semiconductor substrate), using a common process, and one or more other semiconductor devices are picked, placed, and soldered onto the substrate 1002. For example, an array of photodetectors 1004 may be formed directly on the substrate 1002, which in some cases may be a Si substrate. A semiconductor laser 1006 (e.g., a VCSEL) may then be bonded (e.g., flip-chip bonded) to the substrate 1002. In some cases, the semiconductor laser 1006 may be integrated with a photodetector. In other cases, the semiconductor laser 1006 may be mounted over a photodetector 1004 that has already been formed on the substrate 1002. Fabricating photodetectors 1004 on a separate substrate 1002 (e.g., a Si substrate) with respect to the semiconductor laser's epi (e.g., GaAs) allows for a higher density photodetector arrangement, higher speed readout, more wafer-level signal processing capability, and lower manufacturing cost. It is possible to form universal or individually customized dielectric thin film filters and on-chip micro-optics on the photodetectors 1004 to enhance their angular and spectral selectivity with respect to the semiconductor laser 1006 and optical sensor system 1000.

The optical sensor system 1000 may or may not include an optical subsystem 1008 (e.g., as described with reference to any of FIGS. 2-5). In some cases, the optical subsystem 1008 may include an OCL 1010 formed on the back side of the semiconductor laser 1006.

In an alternative arrangement of what is shown in FIG. 10, all of the semiconductor devices 1004, 1006 may be soldered to the substrate 1002—either in a pre-formed array of semiconductor devices, or as individual semiconductor devices.

Figure 11:
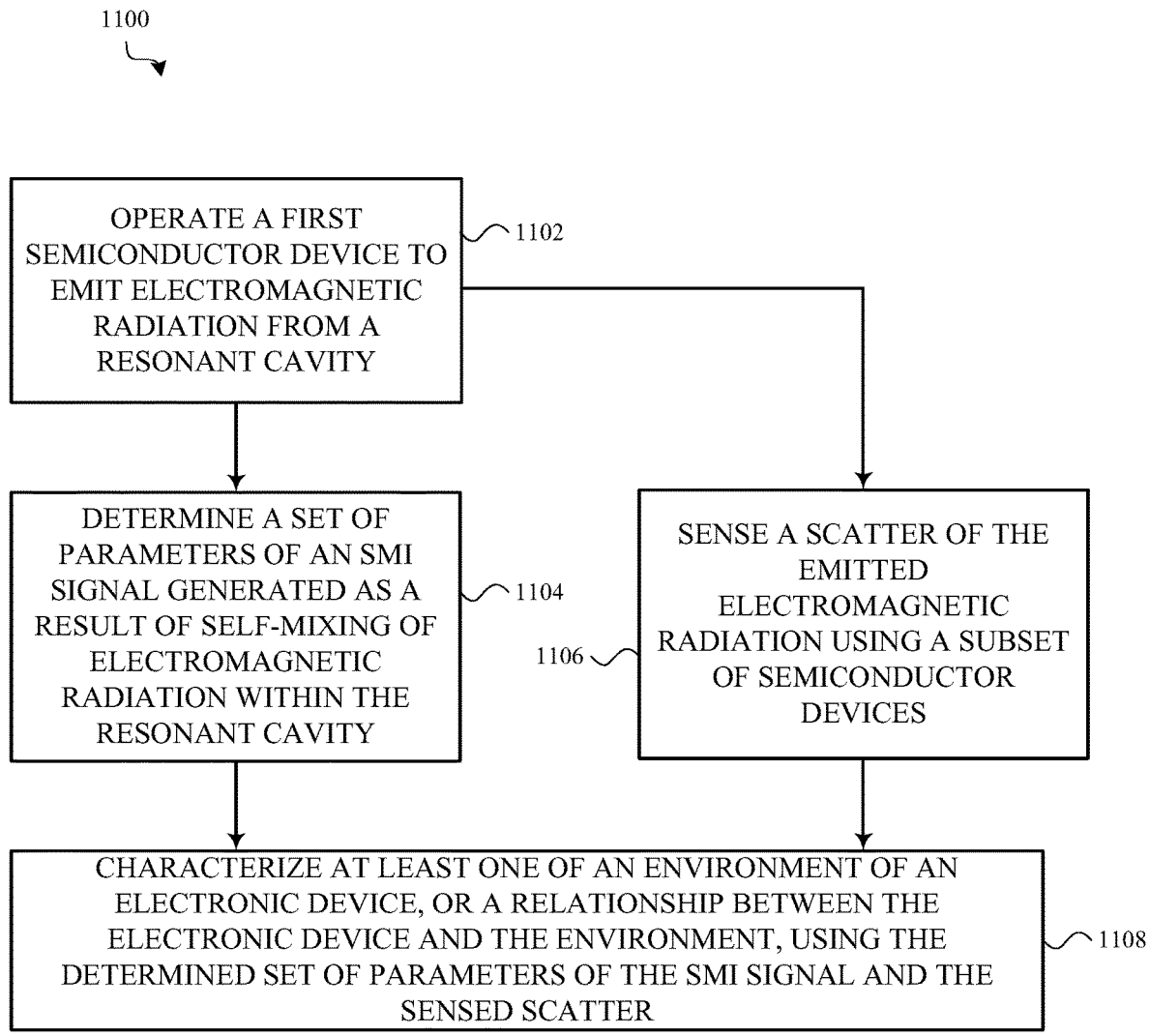
FIG. 11 shows a method of operating a set of semiconductor devices to contemporaneously obtain interferometric and scatterometric measurements.

FIG. 11 shows a method 1100 of operating a set of semiconductor devices to contemporaneously obtain interferometric and scatterometric measurements. The method 1100 may in some cases be performed by a processor, in communication with one of the optical sensor systems described herein.

At block 1102, the method 1100 may include operating a first semiconductor device in the set of semiconductor devices to emit electromagnetic radiation from a resonant cavity of the first semiconductor device.

At block 1104, the method 1100 may include determining a set of parameters of an SMI signal generated as a result of self-mixing of electromagnetic radiation within the resonant cavity.

At block 1106, and contemporaneously with operating the first semiconductor device and determining the set of parameters of the SMI signal, the method 1100 may include sensing a scatter of the emitted electromagnetic radiation using a subset of semiconductor devices in the set of semiconductor devices.

At block 1108, the method 1100 may include characterizing at least one of an environment of an electronic device that includes the set of semiconductor devices, or a relationship between the electronic device and the environment, using the determined set of parameters of the SMI signal and the sensed scatter. Characterizing the environment may in some cases include characterizing an object, particles, a surface, a user, or other items within the environment.

In some embodiments, the operations at blocks 1102-1106 may be repeated, with different semiconductor devices (e.g., SMI sensors) emitting electromagnetic radiation and generating SMI signals sequentially, while other semiconductor devices (e.g., photodetectors) contemporaneously generate scatter signals in response to the electromagnetic radiation emitted by an SMI sensor. The operations at block 1108 may then include characterizing at least one of an environment of an electronic device that includes the set of semiconductor devices, or a relationship between the electronic device and the environment, using all of the determined sets of parameters of the SMI signals and the sensed scatter corresponding to all of the SMI signals.

In some embodiments, the accuracy or resolution of the characterization made at block 1108 may be improved by adding diversity to the SMI sensors and/or photodetectors. For example, different ones of the SMI sensors and/or photodetectors may emit or receive electromagnetic radiation at different angles of incident with respect to an object or surface in an environment, or have different numerical apertures (NAs), different working distances (WDs), or different polarizations. Different SMI sensors may also emit different electromagnetic radiation wavelengths.

The method 1100 may be performed to characterize a variety of relationships between an electronic device and its environment, as described, for example, with reference to FIGS. 12-14B.

Figure 12:
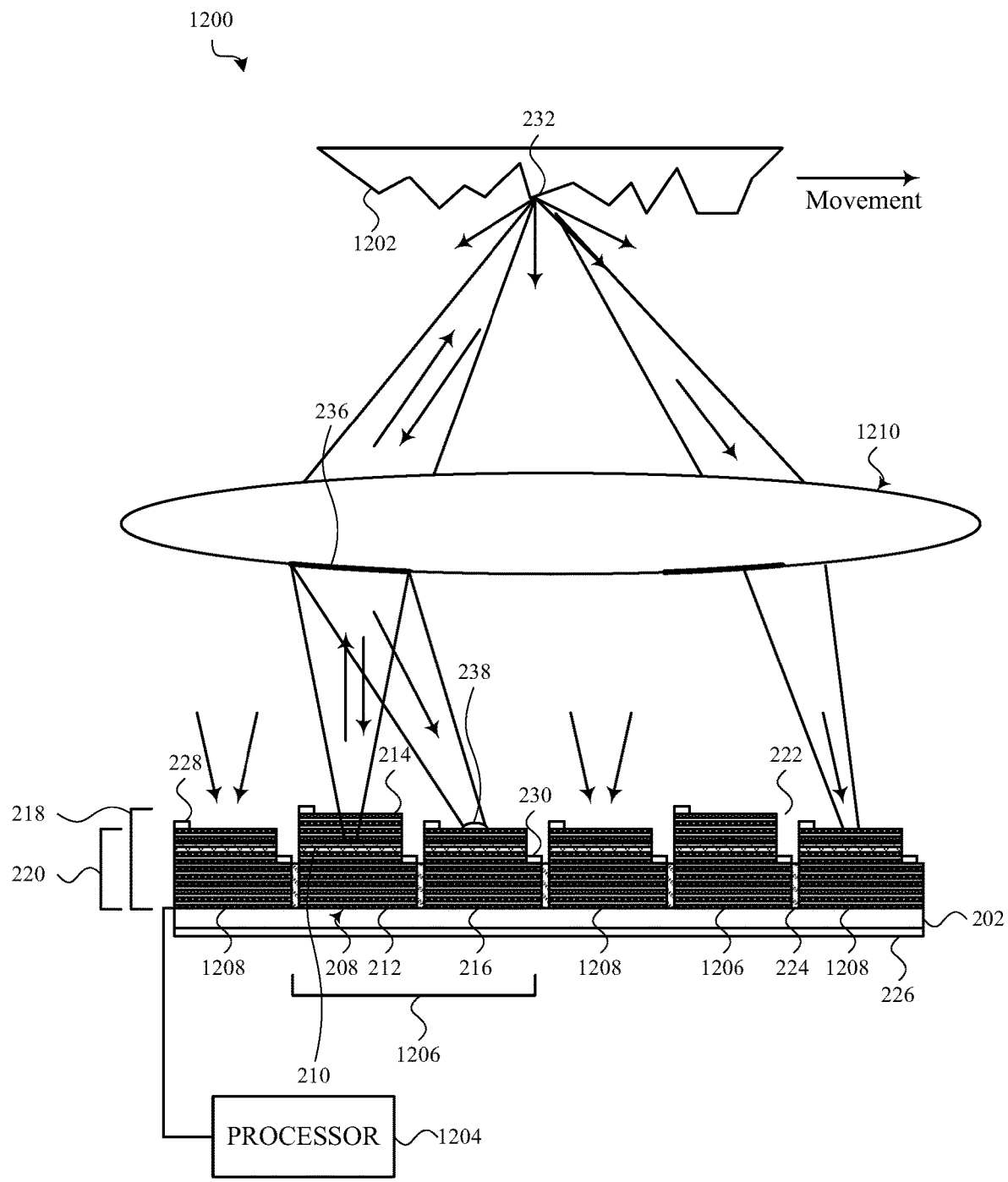
FIG. 12 shows an example use of an optical sensor system to characterize a quality of a surface.

FIG. 12 shows an example use of an optical sensor system 1200 to characterize a quality of a surface 1202. The optical sensor system 1200 may be any of the optical sensor systems described herein, and by way of example is shown to be the optical sensor system described with reference to FIG. 2. In some embodiments, a processor 1204 of the optical sensor system 1200 may characterize the quality of the surface 1202 by performing the method described with reference to FIG. 11 (i.e., characterizing the environment of an electronic device may include characterizing the quality of the surface 1202).

As shown, the optical sensor system 1200 may include at least one SMI sensor 1206 and an array of scatter-detecting photodetectors 1208. Alternatively, the optical sensor system 1200 may include an array of SMI sensors 1206, some of which may be operated as SMI sensors 1206 while others are operated as scatter-detecting photodetectors 1208. An optical subsystem 1210 (e.g., as described with reference to any of FIGS. 2-5) may or may not be provided on or over some or all of the SMI sensors 1206 or photodetectors 1208.

The processor 1204 may receive one or more SMI signals generated by one or more of the SMI sensors 1206 and determine a set of parameters for the SMI signal(s). The processor 1204 may then use the set of parameters to characterize a speckle, roughness, or texture of the surface 1202.

Contemporaneously with receiving the one or more SMI signals, the processor 1204 may use the photodetectors 1208 to sense a scatter of electromagnetic radiation emitted by the one or more SMI sensors 1206 (e.g., the processor 1204 may receive one or more scatter signals generated by the photodetectors 1208). The processor 1204 may use the sensed scatter to determine a power spectral density (or BRDF, or angular-resolved backscattering profile) of the surface. The power spectral density may provide one or more parallel scatter channels (i.e., channels parallel to one or more SMI channels) for determining a roughness or texture of, or correlation length for, the surface 1202. The processor 1204 may then perform a sensor fusion process to fuse the surface characterizations obtained from the SMI and scatter channels. In some cases, this may provide a richer characterization of the surface 1202, with minimal additional power overhead than using the SMI or scatter channel alone. For example, SMI-based sensing, alone, requires some sort of movement between the optical sensor system 1200 and the surface 1202, and may require multiple SMI channels to accurately characterize a surface (e.g., to accurately characterize surface qualities such as roughness or texture). In some cases, the SMI channel(s) may provide a velocity and some roughness information for the surface 1202, and the scatter channels may provide more detailed roughness information for one or more spots on the surface 1202.

Although FIG. 12 shows the SMI sensors 1206 and photodetectors 1208 having a singular optical focus, some or all of the SMI sensors 1206 and/or photodetectors 1208 may alternatively have different optical focuses, or the emission and return paths for electromagnetic radiation emitted and received into a resonant cavity of an SMI sensor 1206 may have different optical focuses. Providing a known lateral offset 1300 (see, e.g., FIG. 13A), horizontal offset, and/or combined lateral and horizontal offset 1302 (see, e.g., FIG. 13B) in the optical focuses of the sensors 1206 and photodetectors 1208 can enable the processor 1204 to better characterize a sub-surface of a non-metal, aqueous, transparent, or otherwise optically-permeable object, such as human tissue, paper, polymers, coatings, and so on. The improved characterization is due to the spatial information (e.g., depth information or other offset information) that the different optical focuses provide.

Figure 13A:
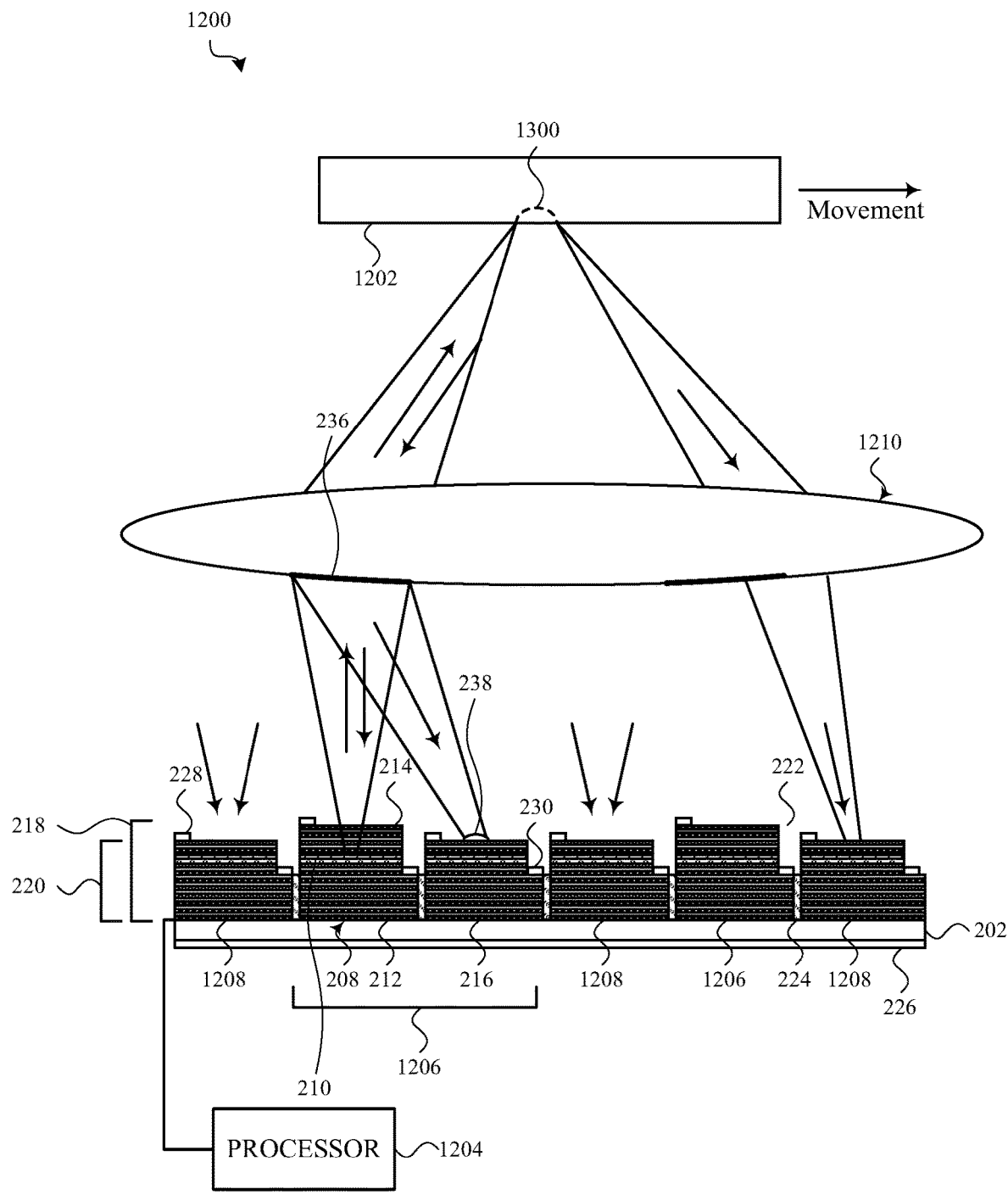
FIG. 13A shows an alternative embodiment of the optical sensor system shown in FIG. 12, with a lateral offset between the optical focuses of different sensors.
Figure 13B:
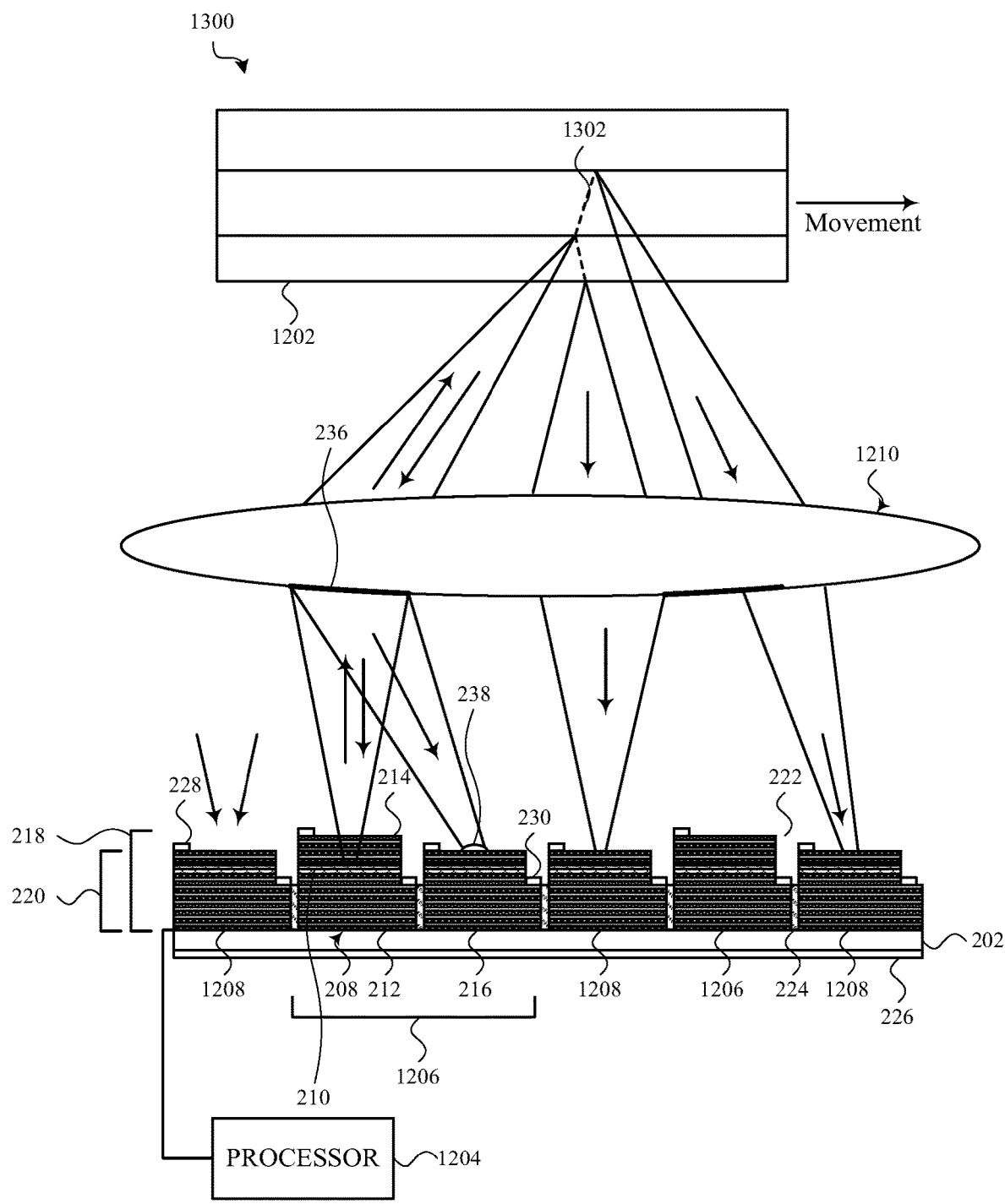
FIG. 13B shows an alternative embodiment of the optical sensor system shown in FIG. 1, with a combined lateral and horizontal offset between the optical focuses of different sensors.

By way of example, the optical sensor systems shown in FIGS. 13A and 13B are useful in a wearable device (or other type of device) that is used to characterize layers of tissue, blood flow (e.g., heartbeat or heartrate), biometric features, or other characteristics (e.g., muscle or bone movements) of a user that are based on tissues or structures located below the exterior surface of a body part of a user.

Besides collecting non-confocal incoherent backscattering information, a multiple optical focus configuration may be applied to an external photon-mixing architecture as shown in FIG. 5B. An optical beam combiner may enable mixing of an LO beam with SC beams from one or multiple backscatter paths. Non-confocal and angular-resolved coherent backscattering information could be collected, and combined with incoherent angular-resolved information to better characterize tissue dynamics. Similarly, such an external photon-mixing architecture may be used in the optical sensor systems and applications described with reference to FIGS. 14 and 15.

Figure 14:
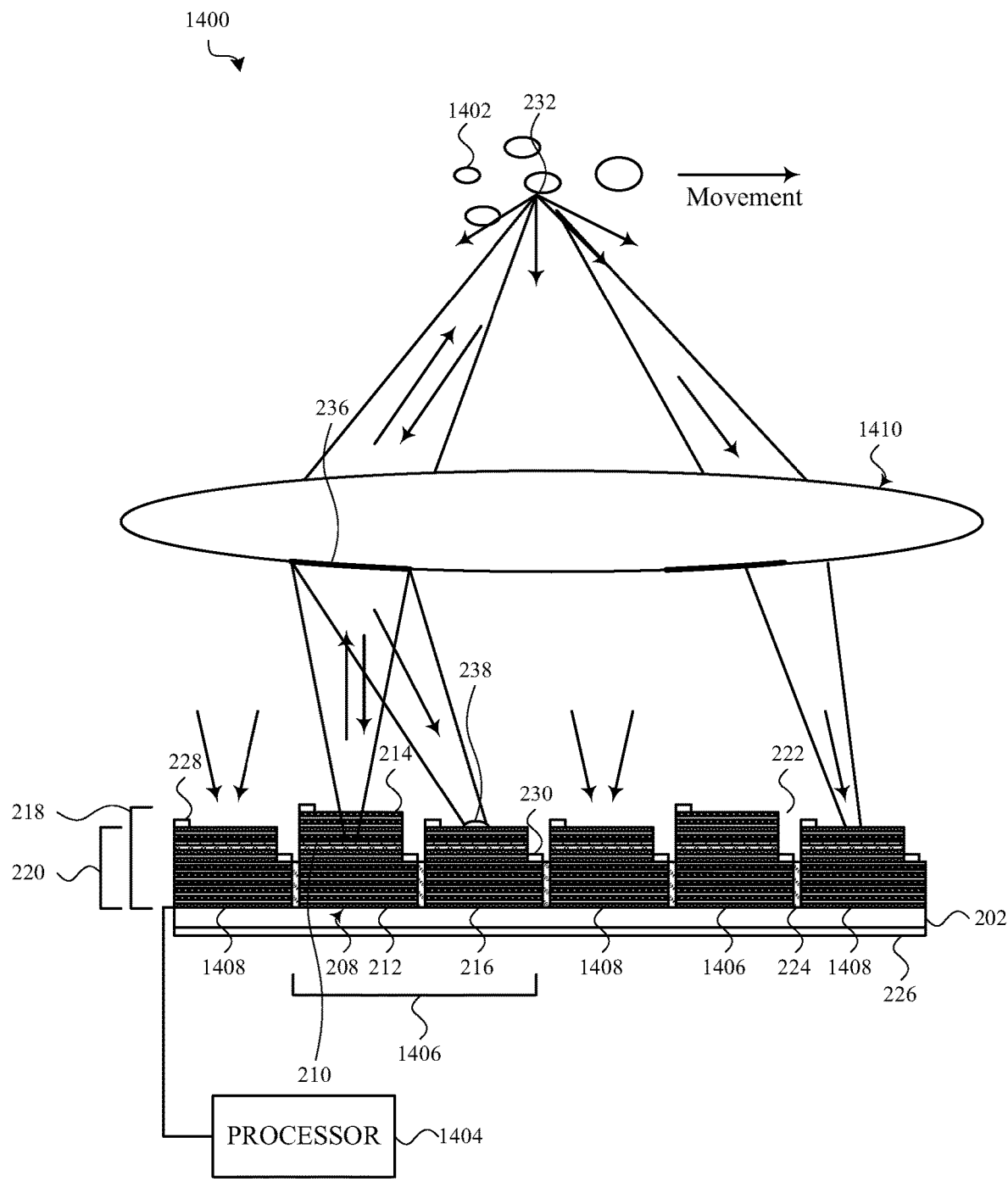
FIG. 14 shows an example use of an optical sensor system to characterize particles or air quality within an environment.

FIG. 14 shows an example use of an optical sensor system 1400 to characterize particles 1402 or air quality within an environment. The optical sensor system 1400 may be any of the optical sensor systems described herein, and by way of example is shown to be the optical sensor system described with reference to FIG. 2. In some embodiments, a processor 1404 of the optical sensor system 1400 may characterize the particles 1402 or an air quality by performing the method described with reference to FIG. 11 (i.e., characterizing the environment of an electronic device may include characterizing the particles 1402 or an air quality).

As shown, the optical sensor system 1400 may include at least one SMI sensor 1406 and an array of scatter-detecting photodetectors 1408. Alternatively, the optical sensor system 1400 may include an array of SMI sensors 1406, some of which may be operated as SMI sensors 1406 while others are operated as scatter-detecting photodetectors 1408. An optical subsystem 1410 (e.g., as described with reference to any of FIGS. 2-5B) may or may not be provided on or over some or all of the SMI sensors 1406 or photodetectors 1408.

The processor 1404 may receive one or more SMI signals generated by one or more of the SMI sensors 1406 and determine a set of parameters for the SMI signal(s). The processor 1404 may then use the set of parameters to characterize the particles 1402 (e.g., a speed, size, surface quality, or density of the particles 1402).

Contemporaneously with receiving the one or more SMI signals, the processor 1404 may use the photodetectors 1408 to sense a scatter of electromagnetic radiation emitted by the one or more SMI sensors 1406 (e.g., the processor 1404 may receive one or more scatter signals generated by the photodetectors 1408). The processor 1404 may use the sensed scatter to determine a power spectral density (or BRDF, or angular-resolved backscattering profile) of the environment, and analyze the power spectral density to determine a size (particle size) of the particles 1402.

The processor 1404 may use the parameter(s) of the SMI signal(s) and/or the sensed scatter to determine a particulate matter concentration or air quality. The processor 1404 may in some cases use the sensed scatter to identify low counts of particles 1402 and/or properties of slow-moving particles 1402, and use the SMI signals to characterize high counts of particles 1402 and/or fast-moving particles 1402. The processor 1404 may in some cases use the sensed scatter to identify false positives or false negatives in particle characterizations made using the SMI signal(s) (or vice versa, using the SMI signal(s) to identify false positives or false negatives in particle characterizations made using the sensed scatter).

In some embodiments, the processor 1404 may selectively power down the SMI sensors 1406, or operate the SMI sensors 1406 in a low power state, for a period of time after determining there are relatively few particles 1402 or the particles 1402 are relatively slow-moving.

Figure 15A:
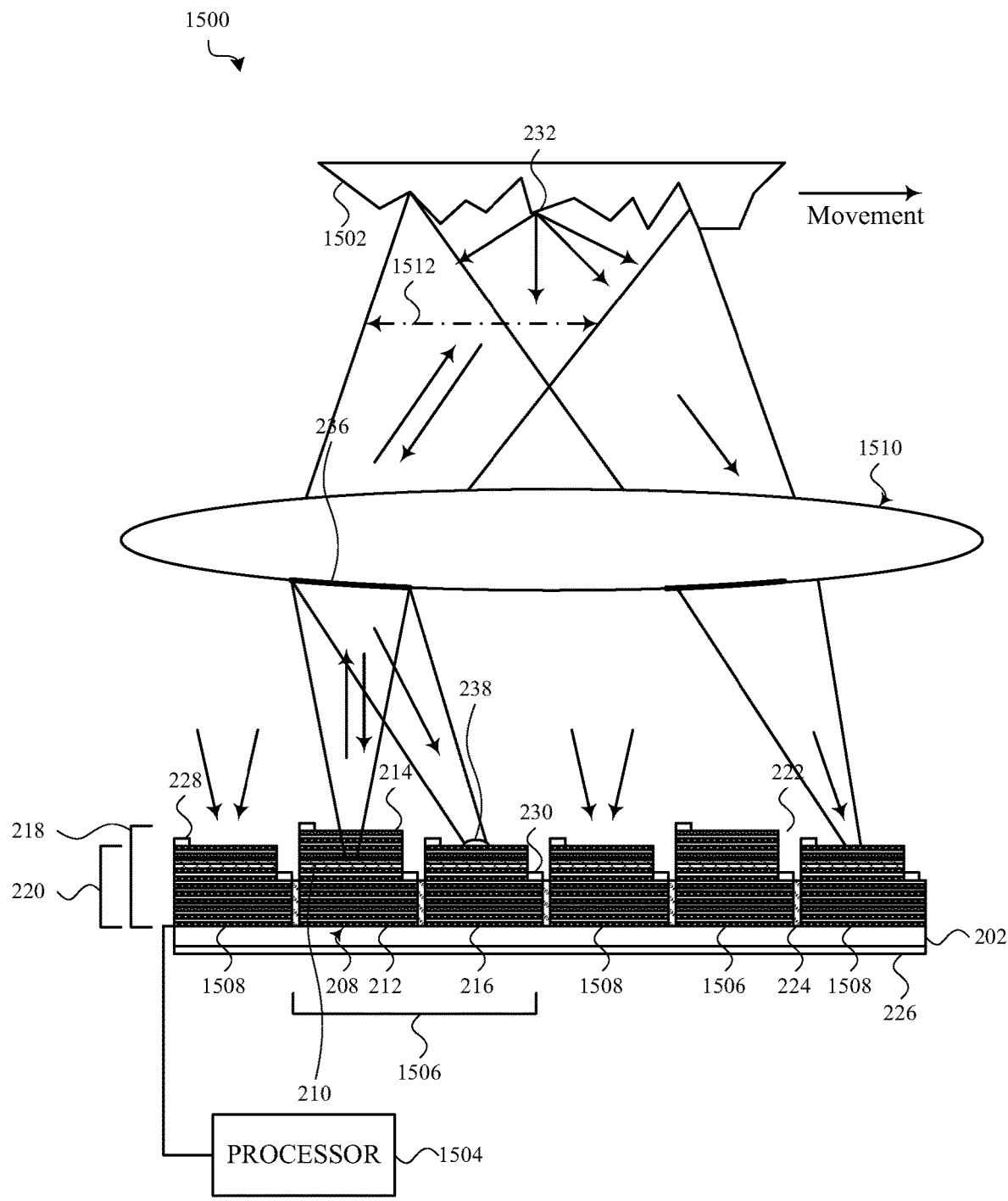
FIGS. 15A and 15B show example uses of an optical sensor system to characterize a relationship between an electronic device that carries the optical sensor system and a surface.
Figure 15B:
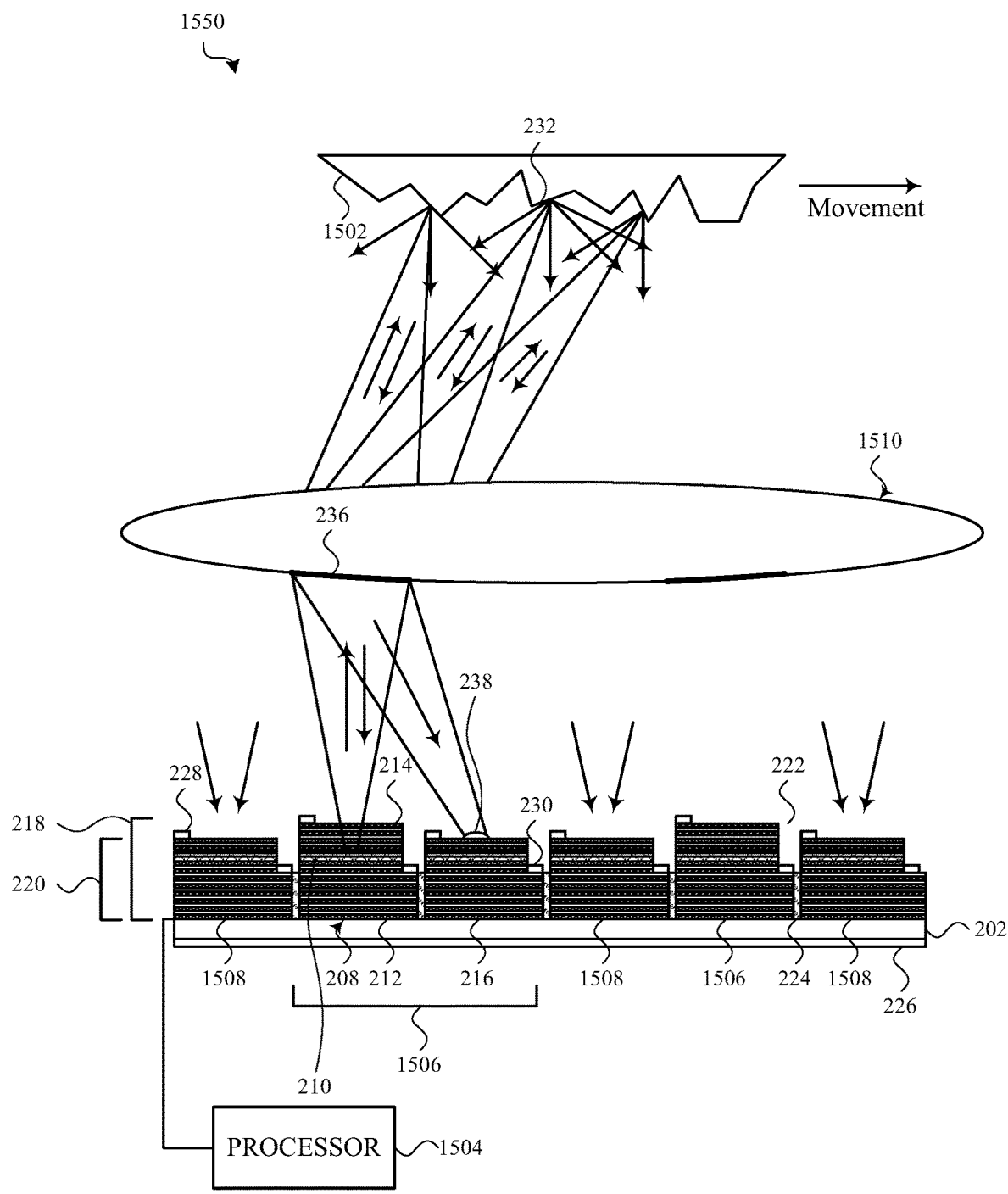

FIGS. 15A and 15B show example uses of an optical sensor system 1500 to characterize a relationship between an electronic device that carries the optical sensor system 1500 and a surface 1502. The optical sensor system 1500 may be any of the optical sensor systems described herein, and by way of example is shown to be the optical sensor system described with reference to FIG. 2. In some embodiments, a processor 1504 of the optical sensor system 1500 may characterize the relationship between the electronic device and the surface 1502 by performing the method described with reference to FIG. 11.

As shown, the optical sensor system 1500 may include at least one SMI sensor 1506 and an array of scatter-detecting photodetectors 1508. Alternatively, the optical sensor system 1500 may include an array of SMI sensors 1506, some of which may be operated as SMI sensors 1506 while others are operated as scatter-detecting photodetectors 1508.

An optical subsystem 1510 (e.g., as described with reference to any of FIGS. 2-5) may be provided on or over some or all of the SMI sensors 1506 or photodetectors 1508. As shown in FIG. 15A, the optical subsystem 1510 may fan out the electromagnetic radiation emitted by an SMI sensor 1506 to illuminate a broad swath 1512 of the surface 1502 (i.e., the optical subsystem 1510 may flood a region of the surface with illumination). Alternatively, and as shown in FIG. 15B, the optical subsystem 1510 may include an optical beam splitter that splits the electromagnetic radiation emitted by an SMI sensor 1506 to illuminate different points on the surface 1502. As another option, and as part of the optical subsystem 1510 described with reference to FIG. 15A or 15B or any of the optical subsystems described with reference to FIGS. 2-5, the optical subsystem 1510 may actively scan a beam of electromagnetic radiation emitted by an SMI sensor over the surface 1502. The scanning may result in a single point, multiple points, a line or lines or other structured pattern of illumination, or flood illumination may be scanned over the surface 1502.

The processor 1504 may receive one or more SMI signals generated by one or more of the SMI sensors 1506 and determine a set of parameters for the SMI signal(s). Contemporaneously with receiving the one or more SMI signals, the processor 1504 may use the photodetectors 1508 to sense a scatter of electromagnetic radiation emitted by the one or more SMI sensors 1506 (e.g., the processor 1504 may receive one or more scatter signals generated by the photodetectors 1508).

The processor 1504 may use the parameter(s) of the SMI signal(s) and/or the sensed scatter to track movement of the optical sensor system 1500 over the surface 1502 (or movement of the surface 1502 with respect to the optical sensor system 1500). The processor 1504 may in some cases use the SMI signal(s) to track movement of the optical sensor system 1500 with respect to the surface 1502, and may rely on the SMI signal(s) solely or to a greater degree during high-speed movement of the optical sensor system 1500 (e.g., movement less than a threshold speed of movement). The processor may in some cases use the scatter signals to track movement of the optical sensor system 1500 with respect to the surface 1502, and may rely on the scatter signals solely or to a greater degree during low-speed movement of the optical sensor system 1500 (e.g., movement above the threshold speed of movement). The scatter signals may be used to track optical flow of the emitted electromagnetic radiation (e.g., a movement of structured light and/or changes in a spatial speckle pattern on the surface 1502).

Movement between the optical sensor system 1500 and surface 1502 may also be tracked using both the SMI signal(s) and scatter signals. Sensitivity, fidelity, and power consumption can be optimized between SMI and scatter channels for tracking a particular type of surface 1502 (e.g., digital input, biometric acquisition, bio-authentication, and so on). In some cases, SMI signals may be used for high-speed tracking or make/break determinations, and scatter signals (or optical flow analysis) can be used for fine or low-speed tracking, or calibration of SMI thermal, speckle, or spatial crosstalk.

Figure 16A:
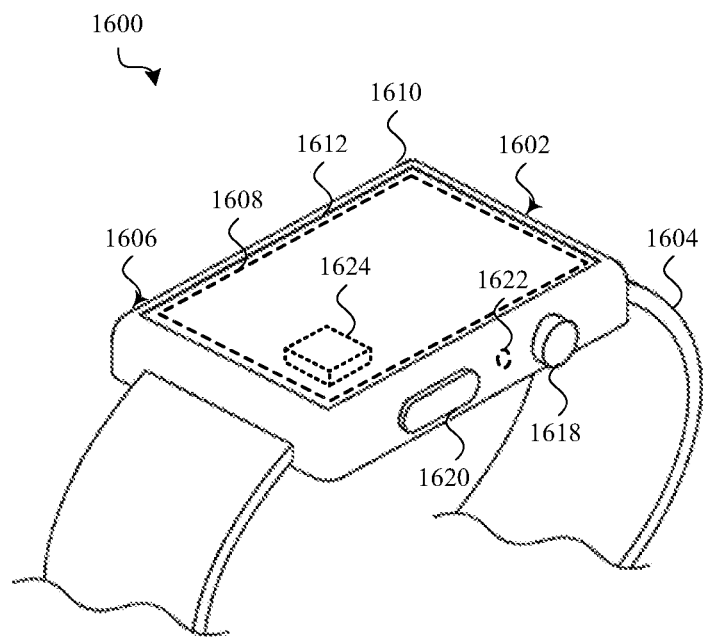
FIGS. 16A and 16B show an example of a device (an electronic device) that includes an optical sensor system.
Figure 16B:
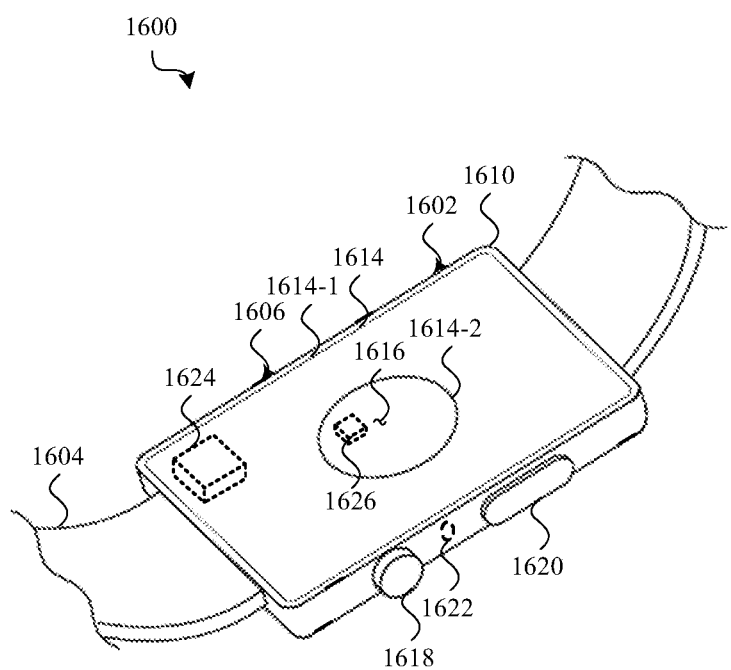

FIGS. 16A and 16B show an example of a device 1600 (an electronic device) that includes an optical sensor system 1624, such as any of the optical sensor systems described herein. The optical sensor system 1624 may be used, for example, to acquire biological information from the wearer or user of the device 1600 (e.g., a heart rate, respiration rate, blood pressure, blood flow rate, blood oxygenation, blood glucose level, and so on), or to determine a status of the device 1600 (e.g., whether the device 1600 is being worn or a tightness of the device 1600), or parameters of an environment of the device 1600 (e.g., an air quality or particle concentration). The device's dimensions and form factor, and inclusion of a band 1604 (e.g., a wrist band), suggest that the device 1600 is an electronic watch, fitness monitor, or health diagnostic device. However, the device 1600 could alternatively be any type of wearable device. FIG. 16A shows a front isometric view of the device 1600, and FIG. 16B shows a back isometric view of the device 1600.

The device 1600 may include a body 1602 (e.g., a watch body) and a band 1604. The body 1602 may include an input or selection device, such as a crown 1618 or a button 1620. The band 1604 may be attached to a housing 1606 of the body 1602, and may be used to attach the body 1602 to a body part (e.g., an arm, wrist, leg, ankle, or waist) of a user. The body 1602 may include a housing 1606 that at least partially surrounds a display 1608. In some embodiments, the housing 1606 may include a sidewall 1610, which sidewall 1610 may support a front cover 1612 (FIG. 16A) and/or a back cover 1614 (FIG. 16B). The front cover 1612 may be positioned over the display 1608, and may provide a window through which the display 1608 may be viewed. In some embodiments, the display 1608 may be attached to (or abut) the sidewall 1610 and/or the front cover 1612. In alternative embodiments of the device 1600, the display 1608 may not be included and/or the housing 1606 may have an alternative configuration.

The display 1608 may include one or more light-emitting elements including, for example, light-emitting elements that define a light-emitting diode (LED) display, organic LED (OLED) display, liquid crystal display (LCD), electroluminescent (EL) display, or other type of display. In some embodiments, the display 1608 may include, or be associated with, one or more touch and/or force sensors that are configured to detect a touch and/or a force applied to a surface of the front cover 1612.

In some embodiments, the sidewall 1610 of the housing 1606 may be formed using one or more metals (e.g., aluminum or stainless steel), polymers (e.g., plastics), ceramics, or composites (e.g., carbon fiber). The front cover 1612 may be formed, for example, using one or more of glass, a crystal (e.g., sapphire), or a transparent polymer (e.g., plastic) that enables a user to view the display 1608 through the front cover 1612. In some cases, a portion of the front cover 1612 (e.g., a perimeter portion of the front cover 1612) may be coated with an opaque ink to obscure components included within the housing 1606. In some cases, all of the exterior components of the housing 1606 may be formed from a transparent material, and components within the device 1600 may or may not be obscured by an opaque ink or opaque structure within the housing 1606.

The back cover 1614 may be formed using the same material(s) that are used to form the sidewall 1610 or the front cover 1612. In some cases, the back cover 1614 may be part of a monolithic element that also forms the sidewall 1610. In other cases, and as shown, the back cover 1614 may be a multi-part back cover, such as a back cover having a first back cover portion 1614-1 attached to the sidewall 1610 and a second back cover portion 1614-2 attached to the first back cover portion 1614-1. The second back cover portion 1614-2 may in some cases have a circular perimeter and an arcuate exterior surface 1616 (i.e., an exterior surface 1616 having an arcuate profile).

The front cover 1612, back cover 1614, or first back cover portion 1614-1 may be mounted to the sidewall 1610 using fasteners, adhesives, seals, gaskets, or other components. The second back cover portion 1614-2, when present, may be mounted to the first back cover portion 1614-1 using fasteners, adhesives, seals, gaskets, or other components.

A display stack or device stack (hereafter referred to as a "stack") including the display 1608 may be attached (or abutted) to an interior surface of the front cover 1612 and extend into an interior volume of the device 1600. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 1612 (e.g., to a display surface of the device 1600).

In some cases, a force sensor (or part of a force sensor system) may be positioned within the interior volume below and/or to the side of the display 1608 (and in some cases within the device stack). The force sensor (or force sensor system) may be triggered in response to the touch sensor detecting one or more touches on the front cover 1612 (or a location or locations of one or more touches on the front cover 1612), and may determine an amount of force associated with each touch, or an amount of force associated with the collection of touches as a whole. The force sensor (or force sensor system) may alternatively trigger operation of the touch sensor (or touch sensor system), or may be used independently of the touch sensor (or touch sensor system).

The device 1600 may include various sensors. In some embodiments, the device 1600 may have a port 1622 (or set of ports) on a side of the housing 1606 (or elsewhere), and an ambient pressure sensor, ambient temperature sensor, internal/external differential pressure sensor, gas sensor, particulate matter concentration sensor, or air quality sensor may be positioned in or near the port(s) 1622. In some cases, the sensor may include the optical sensor system 1624. In other embodiments, the optical sensor system 1624 may perform its sensing through the front cover 1612 (and in some cases through the display 1608), through the back cover 1614, through the button 1620, through the top or ring of the crown 1618, or through the sidewall of the housing 1606.

In some cases, one or more skin-facing sensors 1626 may be included within the device 1600. The skin-facing sensor(s) 1626 may emit or transmit signals through the housing 1606 (or back cover 1614) and/or receive signals or sense conditions through the housing 1606 (or back cover 1614). For example, in some embodiments, one or more such sensors may include a number of electromagnetic radiation emitters (e.g., visible light and/or IR emitters) and/or a number of electromagnetic radiation detectors (e.g., visible light and/or IR detectors, such as any of the electromagnetic radiation detectors described herein). The sensors may be used, for example, to acquire biological information from the wearer or user of the device 1600 (e.g., a heart rate, respiration rate, blood pressure, blood flow rate, blood oxygenation, blood glucose level, and so on), or to determine a status of the device 1600 (e.g., whether the device 1600 is being worn or a tightness of the device 1600). In some cases, the skin-facing sensor(s) 1626 may include the optical sensor system 1624.

The device 1600 may include circuitry (e.g., a processor and/or other components) configured to determine or extract, at least partly in response to signals received directly or indirectly from one or more of the device's sensors, and by way of example, biological parameters of the device's user, a status of the device 1600, and/or parameters or characteristics of an environment of the device 1600. In some embodiments, the circuitry may be configured to convey the determined or extracted parameters or statuses via an output device of the device 1600. For example, the circuitry may cause the indication(s) to be displayed on the display 1608, indicated via audio or haptic outputs, transmitted via a wireless communications interface or other communications interface, and so on. The circuitry may also or alternatively maintain or alter one or more settings, functions, or aspects of the device 1600, including, in some cases, what is displayed on the display 1608.

Figure 17A:
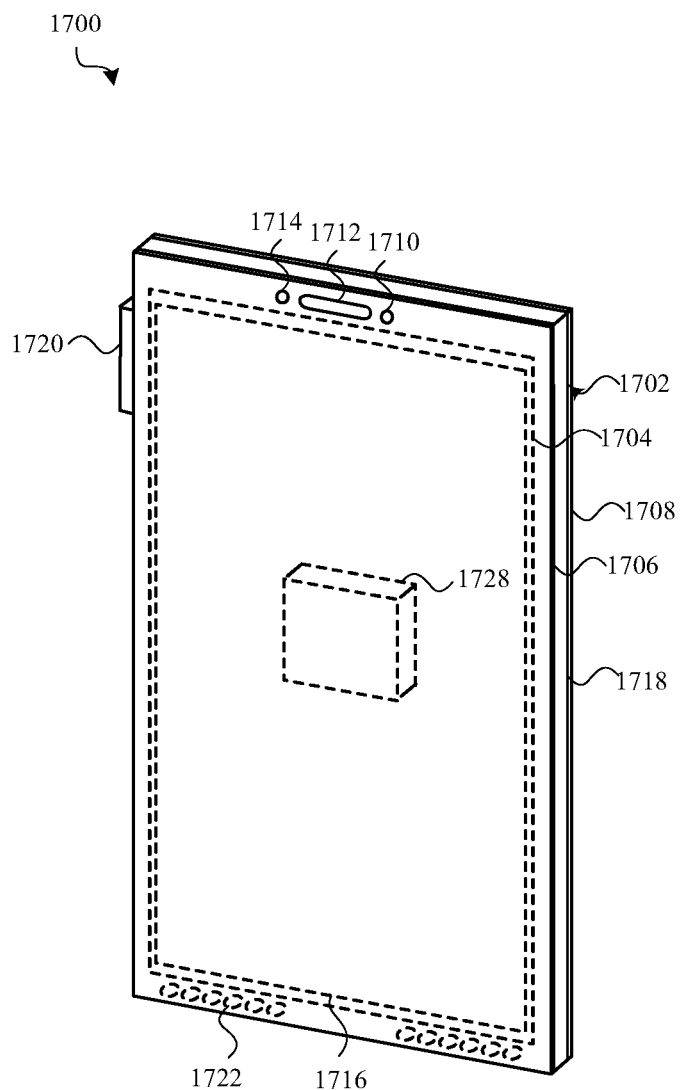
FIGS. 17A and 17B show another example of a device (an electronic device) that includes an optical sensor system.
Figure 17B:
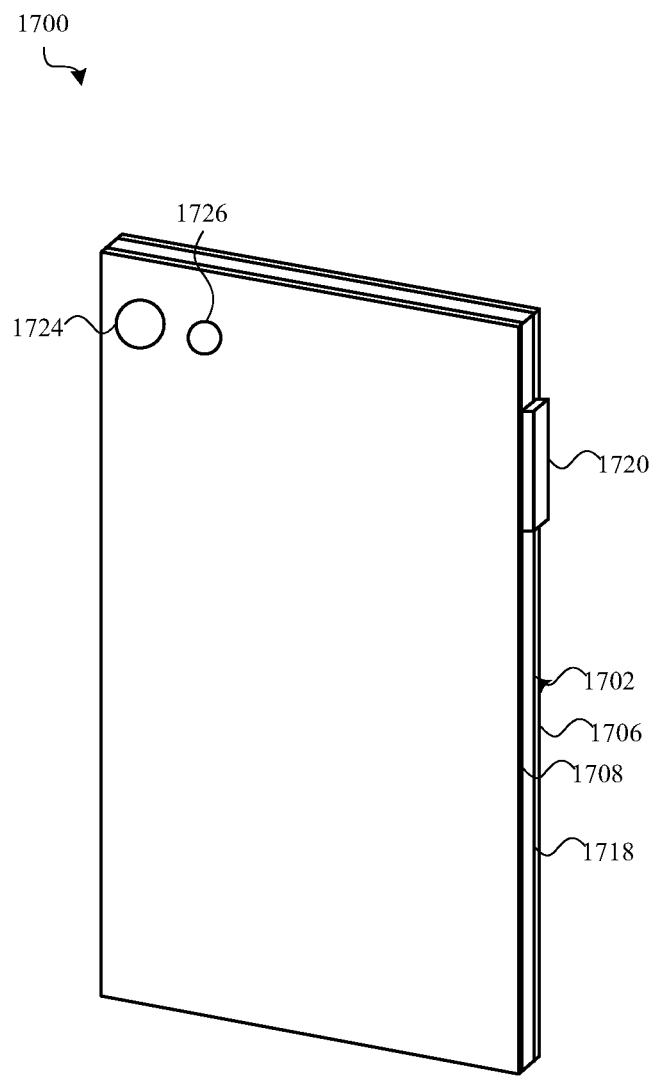

FIGS. 17A and 17B show another example of a device 1700 (an electronic device) that includes an optical sensor system 1728. The optical sensor system 1728 may be used, for example, to acquire biological information from the user of the device 1700, to determine parameters of an environment of the device 1700 (e.g., air quality), or to determine a distance to, movement of, or composition of a target or object.

The device's dimensions and form factor, including the ratio of the length of its long sides to the length of its short sides, suggest that the device 1700 is a mobile phone (e.g., a smartphone). However, the device's dimensions and form factor are arbitrarily chosen, and the device 1700 could alternatively be any portable electronic device including, for example, a mobile phone, tablet computer, portable computer, portable music player, portable terminal, vehicle navigation system, robot navigation system, or other portable or mobile device. The device 1700 could also be a device that is semi-permanently located (or installed) at a single location (e.g., a door lock, thermostat, refrigerator, or other appliance). FIG. 17A shows a front isometric view of the device 1700, and FIG. 17B shows a rear isometric view of the device 1700. The device 1700 may include a housing 1702 that at least partially surrounds a display 1704. The housing 1702 may include or support a front cover 1706 or a rear cover 1708. The front cover 1706 may be positioned over the display 1704, and may provide a window through which the display 1704 (including images displayed thereon) may be viewed by a user. In some embodiments, the display 1704 may be attached to (or abut) the housing 1702 and/or the front cover 1706.

The display 1704 may include one or more light-emitting elements or pixels, and in some cases may be an LED display, an OLED display, an LCD, an EL display, a laser projector, or another type of electronic display. In some embodiments, the display 1704 may include, or be associated with, one or more touch and/or force sensors that are configured to detect a touch and/or a force applied to a surface of the front cover 1706.

The various components of the housing 1702 may be formed from the same or different materials. For example, a sidewall 1718 of the housing 1702 may be formed using one or more metals (e.g., stainless steel), polymers (e.g., plastics), ceramics, or composites (e.g., carbon fiber). In some cases, the sidewall 1718 may be a multi-segment sidewall including a set of antennas. The antennas may form structural components of the sidewall 1718. The antennas may be structurally coupled (to one another or to other components) and electrically isolated (from each other or from other components) by one or more non-conductive segments of the sidewall 1718. The front cover 1706 may be formed, for example, using one or more of glass, a crystal (e.g., sapphire), or a transparent polymer (e.g., plastic) that enables a user to view the display 1704 through the front cover 1706. In some cases, a portion of the front cover 1706 (e.g., a perimeter portion of the front cover 1706) may be coated with an opaque ink to obscure components included within the housing 1702. The rear cover 1708 may be formed using the same material(s) that are used to form the sidewall 1718 or the front cover 1706, or may be formed using a different material or materials. In some cases, the rear cover 1708 may be part of a monolithic element that also forms the sidewall 1718 (or in cases where the sidewall 1718 is a multi-segment sidewall, those portions of the sidewall 1718 that are non-conductive). In still other embodiments, all of the exterior components of the housing 1702 may be formed from a transparent material, and components within the device 1700 may or may not be obscured by an opaque ink or opaque structure within the housing 1702.

The front cover 1706 may be mounted to the sidewall 1718 to cover an opening defined by the sidewall 1718 (i.e., an opening into an interior volume in which various electronic components of the device 1700, including the display 1704, may be positioned). The front cover 1706 may be mounted to the sidewall 1718 using fasteners, adhesives, seals, gaskets, or other components.

A display stack or device stack (hereafter referred to as a "stack") including the display 1704 (and in some cases the front cover 1706) may be attached (or abutted) to an interior surface of the front cover 1706 and extend into the interior volume of the device 1700. In some cases, the stack may also include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 1706 (e.g., to a display surface of the device 1700).

The stack may also include one or an array of sensors 1716, with the sensors positioned in front of or behind, or interspersed with, the light-emitting elements of the display 1704. In some cases, an array of sensors 1716 may extend across an area equal in size to the area of the display 1704. Alternatively, the array of sensors 1716 may extend across an area that is smaller than or greater than the area of the display 1704, or may be positioned entirely adjacent the display 1704. Although the array of sensors 1716 is shown to have a rectangular boundary, the array could alternatively have a boundary with a different shape, including, for example, an irregular shape. The array of sensors 1716 may be variously configured as an ambient light sensor, a health sensor (e.g., age sensor), a touch sensor, a proximity sensor, a health sensor, a biometric sensor (e.g., a fingerprint sensor or facial recognition sensor), a camera, a depth sensor, an air quality sensor, and so on. The array of sensors 1716 may also or alternatively function as a proximity sensor, for determining whether an object (e.g., a finger, face, or stylus) is proximate to the front cover 1706. In some embodiments, the array of sensors 1716 may provide the touch sensing capability (i.e., touch sensor) of the stack. In some embodiments, the array of sensors 1716 may include or be the optical sensor system 1728.

In some cases, a force sensor (or part of a force sensor system) may be positioned within the interior volume below and/or to the side of the display 1704 (and in some cases within the stack). The force sensor (or force sensor system) may be triggered in response to the touch sensor detecting one or more touches on the front cover 1706 (or indicating a location or locations of one or more touches on the front cover 1706), and may determine an amount of force associated with each touch, or an amount of force associated with the collection of touches as a whole.

As shown primarily in FIG. 17A, the device 1700 may include various other components. For example, the front of the device 1700 may include one or more front-facing cameras 1710 (including one or more image sensors), speakers 1712, microphones, or other components 1714 (e.g., audio, imaging, and/or sensing components) that are configured to transmit or receive signals to/from the device 1700. In some cases, a front-facing camera 1710, alone or in combination with other sensors, may be configured to operate as a bio-authentication or facial recognition sensor. Additionally or alternatively, the array of sensors 1716 may be configured to operate as a front-facing camera 1710, a bio-authentication sensor, or a facial recognition sensor. In some cases, one or more of the sensors may include one of the optical sensor systems described herein.

The device 1700 may also include buttons or other input devices positioned along the sidewall 1718 and/or on a rear surface of the device 1700. For example, a volume button or multipurpose button 1720 may be positioned along the sidewall 1718, and in some cases may extend through an aperture in the sidewall 1718. The sidewall 1718 may include one or more ports 1722 that allow air, but not liquids, to flow into and out of the device 1700. In some embodiments, one or more sensors may be positioned in or near the port(s) 1722. For example, an ambient pressure sensor, ambient temperature sensor, internal/external differential pressure sensor, gas sensor, particulate matter concentration sensor, or air quality sensor may be positioned in or near a port 1722.

In some embodiments, the rear surface of the device 1700 may include a rear-facing camera 1724. A flash or light source 1726 may also be positioned along the rear of the device 1700 (e.g., near the rear-facing camera). In some cases, the rear surface of the device 1700 may include multiple rear-facing cameras.

In some cases, the sensor(s) 1716, the front-facing camera 1710, the rear-facing camera 1724, and/or other sensors positioned on the front, back, or sides of the device 1700 may emit or transmit signals through the housing 1702 (including the front cover 1706, rear cover 1708, or sidewall 1718) and/or receive signals or sense conditions through the housing 1702. For example, in some embodiments, one or more such sensors may include a number of electromagnetic radiation emitters (e.g., visible light and/or IR emitters) and/or a number of electromagnetic radiation detectors (e.g., visible light and/or IR detectors, such as any of the electromagnetic radiation detectors described herein).

The device 1700 may include circuitry (e.g., a processor and/or other components) configured to determine or extract, at least partly in response to signals received directly or indirectly from one or more of the device's sensors, biological parameters of the device's user, a status of the device 1700, parameters of an environment of the device 1700 (e.g., air quality), or a composition of a target or object, for example. In some embodiments, the circuitry may be configured to convey the determined or extracted parameters or statuses via an output device of the device 1700. For example, the circuitry may cause the indication(s) to be displayed on the display 1704, indicated via audio or haptic outputs, transmitted via a wireless communications interface or other communications interface, and so on. The circuitry may also or alternatively maintain or alter one or more settings, functions, or aspects of the device 1700, including, in some cases, what is displayed on the display 1704.

In embodiments, the optical sensor system 1728 may perform its sensing through the front cover 1706 (e.g., though openings in, around, or adjacent components 1714, 1710, or 1712, and in some cases through the display 1704); through openings in, around, or adjacent components 1724 or 1726; through the button 1720; through openings in, around, or adjacent ports 1622; and so on.

Figure 18:
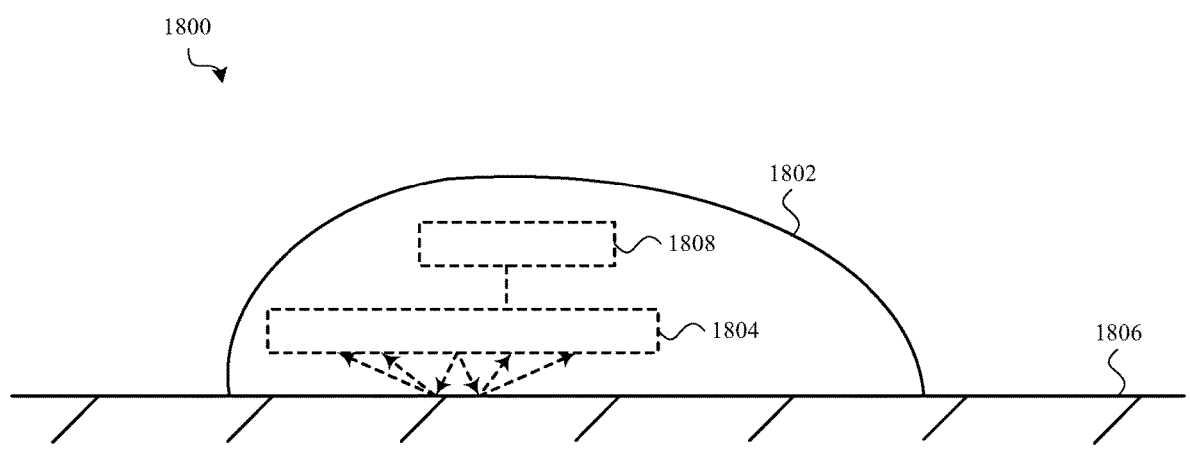
FIG. 18 shows an example of a mouse (an electronic device) that includes an optical sensor system.

FIG. 18 shows an example of a mouse 1800 (an electronic device) that includes an optical sensor system 1804. The mouse 1800 may include a shell or housing 1802. The optical sensor system 1804 may be mounted within the housing 1802, and may emit electromagnetic radiation toward a surface 1806 over which the mouse 1800 is moved. A processor 1808 that receives interferometric and scatterometric signals from the optical sensor system 1804 may use the signals to track the mouse's location with respect to the surface 1806. In some cases, the processor 1808 may perform the method described with reference to FIG. 11 or use the processing techniques described with reference to FIG. 15.

Figure 19:
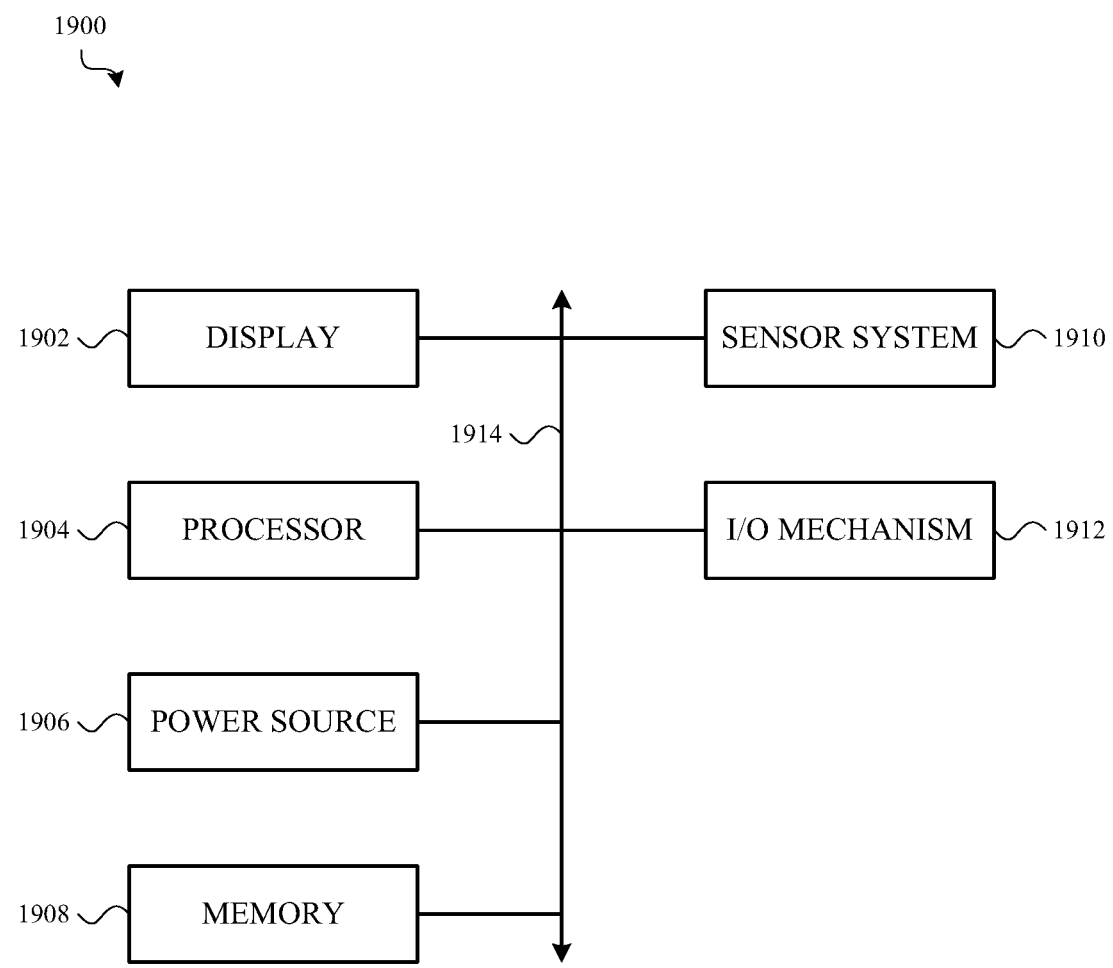
FIG. 19 shows an example electrical block diagram of an electronic device.

FIG. 19 shows a sample electrical block diagram of an electronic device 1900, which electronic device may in some cases be the electronic device described with reference to FIG. 16A-16B, 17A-17B, or 18. The electronic device 1900 may optionally include an electronic display 1902 (e.g., a light-emitting display), a processor 1904, a power source 1906, a memory 1908 or storage device, a sensor system 1910, and/or an input/output (I/O) mechanism 1912 (e.g., an input/output device, input/output port, or haptic input/output interface). The processor 1904 may control some or all of the operations of the electronic device 1900. The processor 1904 may communicate, either directly or indirectly, with some or all of the other components of the electronic device 1900. For example, a system bus or other communication mechanism 1914 can provide communication between the electronic display 1902, the processor 1904, the power source 1906, the memory 1908, the sensor system 1910, and the I/O mechanism 1912.

The processor 1904 may be implemented as any electronic device capable of processing, receiving, or transmitting data or instructions, whether such data or instructions is in the form of software or firmware or otherwise encoded. For example, the processor 1904 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 1904 may provide part or all of the processing system or processor described herein.

It should be noted that the components of the electronic device 1900 can be controlled by multiple processors. For example, select components of the electronic device 1900 (e.g., the sensor system 1910) may be controlled by a first processor and other components of the electronic device 1900 (e.g., the electronic display 1902) may be controlled by a second processor, where the first and second processors may or may not be in communication with each other.

The power source 1906 can be implemented with any device capable of providing energy to the electronic device 1900. For example, the power source 1906 may include one or more batteries or rechargeable batteries. Additionally or alternatively, the power source 1906 may include a power connector or power cord that connects the electronic device 1900 to another power source, such as a wall outlet.

The memory 1908 may store electronic data that can be used by the electronic device 1900. For example, the memory 1908 may store electrical data or content such as, for example, audio and video files, documents and applications, device settings and user preferences, timing signals, control signals, instructions, and/or data structures or databases. The memory 1908 may include any type of memory. By way of example only, the memory 1908 may include random access memory, read-only memory, Flash memory, removable memory, other types of storage elements, or combinations of such memory types.

The electronic device 1900 may also include one or more sensor systems 1910 positioned almost anywhere on the electronic device 1900. In some cases, the sensor systems 1910 may include one or more of the optical sensor systems described herein. The sensor system(s) 1910 may be configured to sense one or more types of parameters, such as but not limited to, vibration; light; touch; force; heat; movement; relative motion; biometric data (e.g., biological parameters) of a user; air quality; proximity; position; connectedness; surface quality; and so on. By way of example, the sensor system(s) 1910 may include an SMI sensor, a heat sensor, a position sensor, a light or optical sensor, an accelerometer, a pressure transducer, a gyroscope, a magnetometer, a health monitoring sensor, and an air quality sensor, and so on. Additionally, the one or more sensor systems 1910 may utilize any suitable sensing technology, including, but not limited to, interferometric, magnetic, capacitive, ultrasonic, resistive, optical, acoustic, piezoelectric, or thermal technologies.

The I/O mechanism 1912 may transmit or receive data from a user or another electronic device. The I/O mechanism 1912 may include the electronic display 1902, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1912 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data (e.g., the surface quality of a user's skin or fingerprint). The present disclosure contemplates that, in some instances, this gathered data may include personal information data that uniquely identifies or can be used to identify, locate, or contact a specific person. Such personal information data can include, for example, biometric data (e.g., fingerprint data) and data linked thereto (e.g., demographic data, location-based data, telephone numbers, email addresses, home addresses, data or records relating to a user's health or level of fitness (e.g., vital signs measurements, medication information, exercise information), date of birth, or any other identifying or personal information).

The present disclosure recognizes that the use of such personal information data, in the present technology, can be used to the benefit of users. For example, the personal information data can be used to authenticate a user to access their device, or gather performance metrics for the user's interaction with an augmented or virtual world. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide data to targeted content delivery services. In yet another example, users can select to limit the length of time data is maintained or entirely prohibit the development of a baseline profile for the user. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An optical sensor system, comprising:
   a semiconductor substrate;
   a self-mixing interferometry (SMI) sensor formed on the semiconductor substrate and including a semiconductor laser having a resonant cavity; and an array of photodetectors formed on the semiconductor substrate; wherein,
the SMI sensor is configured to generate an SMI signal responsive to a retro-reflection of electromagnetic radiation emitted by the semiconductor laser and received into the resonant cavity; and
the array of photodetectors is configured to generate a set of angular-resolved scatter signals responsive to a scatter of the electromagnetic radiation emitted by the semiconductor laser.

2. The optical sensor system of claim 1, wherein the SMI sensor and the array of photodetectors share a subset of epitaxial layers formed on the semiconductor substrate.

3. The optical sensor system of claim 1, wherein:
a set of trenches electrically separate photodetectors in the array of photodetectors.

4. The optical sensor system of claim 3, further comprising:
a set of cathodes for the array of photodetectors, the set of cathodes disposed in the set of trenches.

5. The optical sensor system of claim 4, further comprising:
a set of anodes for the array of photodetectors, the set of anodes disposed on the array of photodetectors; wherein,
the set of cathodes is oriented in a first set of parallel directions;
the set of anodes is oriented in a second set of parallel directions; and
the second set of parallel directions is orthogonal to the first set of parallel directions.

6. The optical sensor system of claim 1, further comprising:
an array of SMI sensors formed on the semiconductor substrate; wherein,
the SMI sensor is a first SMI sensor in the array of SMI sensors; and
the array of photodetectors is provided by additional SMI sensors in the array of SMI sensors.

7. An optical sensor system, comprising:
a wafer-integrated array of semiconductor devices, including,
a semiconductor laser; and
a set of resonant-cavity photodetectors (RCPDs);
an optical subsystem configured to direct a retro-reflection of electromagnetic radiation emitted by the semiconductor laser toward an RCPD in the set of RCPDs, and configured to direct an angular-resolved scatter of the electromagnetic radiation emitted by the semiconductor laser toward a subset or all RCPDs in the set of RCPDs.

8. The optical sensor system of claim 7, wherein all of the RCPDs in the set of RCPDs are in-plane.

9. The optical sensor system of claim 7, wherein a first RCPD is integrated or stacked with the semiconductor laser.

10. The optical sensor system of claim 7, wherein:
the RCPD in the set of RCPDs is a first RCPD; and
the optical subsystem provides confocal imaging for,
the first RCPD; and
a second RCPD in a subset of RCPDs.

11. The optical sensor system of claim 7, wherein:
the RCPD in the set of RCPDs is a first RCPD; and
the optical subsystem provides non-confocal imaging for,
the first RCPD; and
a second RCPD in a subset of RCPDs.

12. The optical sensor system of claim 7, wherein the optical subsystem comprises:
a telecentric-confocal imaging system positioned apart from the wafer-integrated array of semiconductor devices in an electromagnetic radiation emission path of the semiconductor laser, and in a set of electromagnetic radiation reception paths of the set of RCPDs.

13. The optical sensor system of claim 7, wherein the optical subsystem comprises:
a set of on-chip lenses disposed on the semiconductor laser and the set of RCPDs; and
a confocal imaging system positioned apart from the wafer-integrated array of semiconductor devices, in an electromagnetic radiation emission path of the semiconductor laser, and in a set of electromagnetic radiation reception paths of the set of RCPDs.

14. The optical sensor system of claim 13, wherein the optical subsystem comprises:
an optical beam splitter positioned in the electromagnetic radiation emission path of the semiconductor laser.

15. The optical sensor system of claim 7, wherein:
the wafer-integrated array of semiconductor devices is attached to a semiconductor wafer; and
the semiconductor laser is flip-chip bonded to the semiconductor wafer, over the RCPD to which the retro-reflection is directed.

16. An electronic device, comprising:
a semiconductor substrate;
a set of semiconductor devices formed on the semiconductor substrate; and
a processor configured to,
operate a first semiconductor device in the set of semiconductor devices to emit electromagnetic radiation from a resonant cavity of the first semiconductor device;
determine a set of parameters of a self-mixing interferometry (SMI) signal generated as a result of a self-mixing of electromagnetic radiation within the resonant cavity;
contemporaneously with operating the first semiconductor device, sense a scatter of the emitted electromagnetic radiation using a subset of semiconductor devices in the set of semiconductor devices; and
characterize at least one of an environment of the electronic device, or a relationship between the electronic device and the environment, using the determined set of parameters of the SMI signal and the sensed scatter.

17. The electronic device of claim 16, wherein:
the environment of the electronic device comprises a surface; and
the processor is configured to characterize the environment of the electronic device by,
determining, using the set of parameters of the SMI signal, at least one of a speckle, a roughness, or a texture of the surface; and
determining a power spectral density of the surface using the sensed scatter.

18. The electronic device of claim 16, wherein:
the electronic device is a wearable device;
the first semiconductor device has a different optical focus than at least a second semiconductor device in the subset of semiconductor devices;
the environment of the electronic device comprises a body part of a user of the electronic device; and the processor is configured to characterize the environment of the electronic device by determining at least one biometric feature of the user.

19. The electronic device of claim 16, wherein:

the environment of the electronic device comprises air; and the processor is configured to characterize the environment of the electronic device by, determining a particle speed using the set of parameters of the SMI signal; and determining a particle size using the sensed scatter.

20. The electronic device of claim 16, wherein:

the environment of the electronic device comprises a surface;

the processor is configured to characterize the relationship between the electronic device and the environment of the electronic device by, characterizing a high speed movement of the electronic device with respect to the surface responsive to at least a sensed self-mixing; and characterizing a low speed movement of the electronic device with respect to the surface responsive to at least the sensed scatter; and the high speed movement and the low speed movement are distinguished by a threshold speed of movement.

21. An optical sensor system, comprising:

a semiconductor substrate;

an external photon-mixing sensor formed on the semiconductor substrate and including, a semiconductor laser; and a photon-mixing detector;

an array of photodetectors formed on the semiconductor substrate; wherein, the external photon-mixing sensor is configured to generate a field-based coherent scatterometry signal responsive to a combination of electromagnetic radiation emitted by the semiconductor laser and a portion of the emitted electromagnetic radiation that is backscattered to the photo-mixing detector; and the array of photodetectors is configured to generate a set of intensity-based scatterometry signals responsive to a backscatter of the electromagnetic radiation emitted by the semiconductor laser.

22. The optical sensor system of claim 21, wherein the semiconductor laser, the photon-mixing detector, and the array of photodetectors share a subset of epitaxial layers formed on the semiconductor substrate.

23. The optical sensor system of claim 21, further comprising:

an optical subsystem configured to, direct a first portion of the electromagnetic radiation emitted by the semiconductor laser to the photon-mixing detector; and direct a second portion of a backscatter of the emitted electromagnetic radiation to the photon-mixing detector.

* * * * *